(12) United States Patent
Guo

(10) Patent No.: US 12,143,695 B2
(45) Date of Patent: Nov. 12, 2024

(54) METHOD AND APPARATUS FOR RECOGNIZING VIDEO CLIP, DEVICE, AND STORAGE MEDIUM

(71) Applicant: Tencent Technology (Shenzhen) Company Limited, Shenzhen (CN)

(72) Inventor: Hui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 39 days.

(21) Appl. No.: 18/200,452

(22) Filed: May 22, 2023

(65) Prior Publication Data

US 2023/0300428 A1 Sep. 21, 2023

Related U.S. Application Data

(63) Continuation of application No. PCT/CN2022/135034, filed on Nov. 29, 2022.

(30) Foreign Application Priority Data

Mar. 8, 2022 (CN) .......................... 202210219364.3

(51) Int. Cl.
*H04N 21/234* (2011.01)
*G06V 10/44* (2022.01)
(Continued)

(52) U.S. Cl.
CPC ......... *H04N 21/8456* (2013.01); *G06V 10/44* (2022.01); *G06V 10/761* (2022.01); *H04N 21/44016* (2013.01)

(58) Field of Classification Search
None
See application file for complete search history.

(56) References Cited

U.S. PATENT DOCUMENTS 9,818,451 B1 * 11/2017 Tyagi .................. G11B 27/3081
2010/0067863 A1 * 3/2010 Wang .................. G11B 27/034
386/279

(Continued)

FOREIGN PATENT DOCUMENTS

CN  110213630 A  9/2019
CN  111479130 A  7/2020
(Continued)

OTHER PUBLICATIONS

Tencent Technology (Shenzhen) Company Limited, ISR, PCT/CN2022/135034, Jan. 18, 2023, 2 pgs.

*Primary Examiner* — Brian T Pendleton
*Assistant Examiner* — Jean D Saint Cyr
(74) *Attorney, Agent, or Firm* — Morgan, Lewis & Bockius LLP

(57) ABSTRACT

This application discloses a method for recognizing a video clip performed by a computer device. The method includes: determining a plurality of video frame pairs between a first video and at least one second video, each video frame pair comprising a first video frame from the first video and a second video frame from the at least second video with a similarity satisfying similarity conditions; fusing the first video frames in the plurality of video frame pairs on the basis of occurrence time differences of each video frame pair to obtain at least one candidate video clip in the first video; and determining at least one target video clip in the first video on the basis of the at least one candidate video clip, the at least one target video clip being within a target time range of the first video.

20 Claims, 9 Drawing Sheets

(51) Int. Cl.
*G06V 10/74* (2022.01)
*H04N 21/2343* (2011.01)
*H04N 21/2668* (2011.01)
*H04N 21/434* (2011.01)
*H04N 21/44* (2011.01)
*H04N 21/845* (2011.01)

(56) References Cited

U.S. PATENT DOCUMENTS

| | | | |
|---|---|---|---|
| 2013/0343597 A1* | 12/2013 | Kocks | G06F 16/9024 |
| | | | 382/100 |
| 2018/0254064 A1 | 9/2018 | Gonzalez-Banos et al. | |
| 2020/0322694 A1 | 10/2020 | Colligan et al. | |

FOREIGN PATENT DOCUMENTS

| | | |
|---|---|---|
| CN | 112131431 A | 12/2020 |
| CN | 112989115 A | 6/2021 |
| CN | 113051984 A | 6/2021 |
| CN | 113836351 A | 12/2021 |
| CN | 114550070 A | 5/2022 |
| GB | 201201423 | 3/2012 |
| KR | 102221792 B1 | 3/2021 |

* cited by examiner

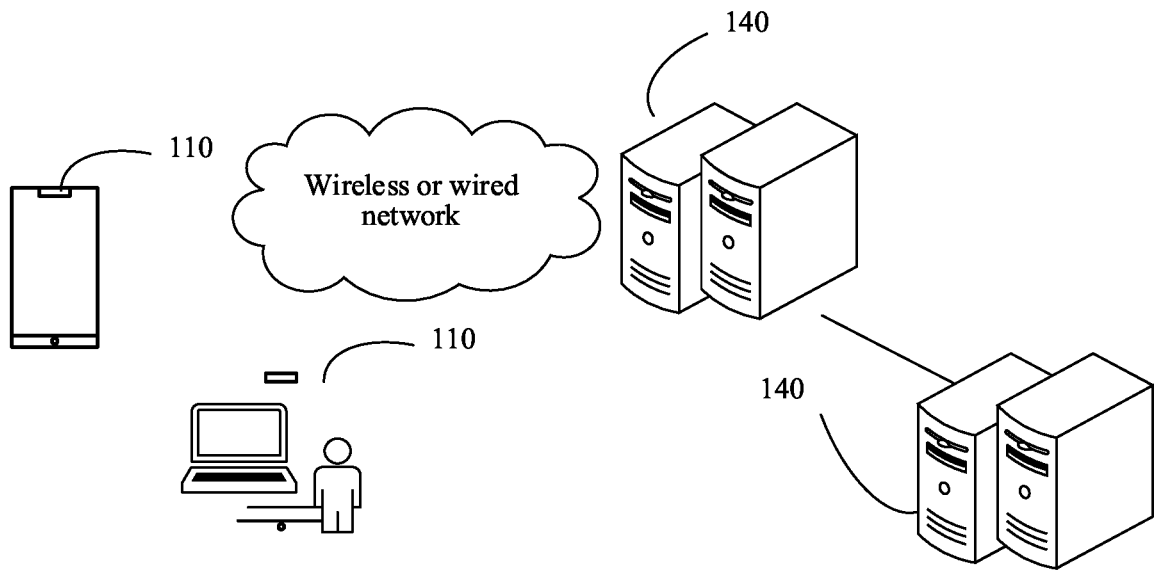

FIG. 1

| |
|---|
| A server acquires video frame features of a first video and video frame features of at least one second video, and determines a plurality of video frame pairs on the basis of the video frame features of the first video and the video frame features of the at least one second video, where the video frame pair includes a first video frame and a second video frame with a similarity satisfying similarity conditions, the first video frame belongs to the first video, and the second video frame belongs to the at least one second video |

201

| |
|---|
| The server fuses the first video frames in the plurality of video frame pairs on the basis of occurrence time differences of the plurality of video frame pairs to obtain at least one candidate video clip in the first video, where the occurrence time difference refers to a difference between occurrence times of the two video frames in each of the video frame pairs in the videos |

202

| |
|---|
| The server acquires a target time range, and determines at least one target video clip in the first video on the basis of the at least one candidate video clip and the target time range, where the target video clips are within the target time range of the first video |

METHOD AND APPARATUS FOR RECOGNIZING VIDEO CLIP, DEVICE, AND STORAGE MEDIUM

CROSS-REFERENCE TO RELATED APPLICATIONS

This application is a continuation application of PCT Patent Application No. PCT/CN2022/135034, entitled "METHOD AND APPARATUS FOR RECOGNIZING VIDEO CLIP, DEVICE, AND STORAGE MEDIUM" filed on Nov. 29, 2022, which claims priority to Chinese Patent Application No. 202210219364.3, filed to the China Patent Office on Mar. 8, 2022 and entitled "METHOD AND APPARATUS FOR RECOGNIZING VIDEO CLIP, DEVICE, AND STORAGE MEDIUM", the entire contents of which are incorporated herein by reference.

FIELD OF THE TECHNOLOGY

This application relates to the technical field of computers, and in particular to a method and apparatus for recognizing a video clip, a device, and a storage medium.

BACKGROUND OF THE DISCLOSURE

With the development of computer technology, videos are growing rapidly, and more and more users are watching videos on line. Videos include a television play typically having an opening and an ending. In order to provide convenience for a user to watch the television play, a video platform may provide a function of skipping the opening and the ending on the basis of determining positions of the opening and the ending of the television play.

In the related art, the positions of the opening and the ending of the television play are determined by adopting a manual annotation method, that is, the television play is watched manually, and then, the positions of the opening and the ending of the television play are marked.

However, the manual annotation method requires a lot of time and manpower resources, which causes a lower efficiency of determining the opening and the ending of the television play.

SUMMARY

Various embodiments of this application provide a method and apparatus for recognizing a video clip, a device, a storage medium, and a computer program product, technical solutions thereof are described as follows.

A method for recognizing a video clip is performed by a computer device, the method including:
  determining a plurality of video frame pairs between a first video and at least one second video, each video frame pair comprising a first video frame from the first video and a second video frame from the at least second video with a similarity satisfying similarity conditions;
  fusing the first video frames in the plurality of video frame pairs on the basis of occurrence time differences of each video frame pair to obtain at least one candidate video clip in the first video; and
  determining at least one target video clip in the first video on the basis of the at least one candidate video clip, the at least one target video clip being within a target time range of the first video.

A computer device is provided, including one or more processors, and one or more memories having stored thereon at least one computer program which is loaded and executed by the one or more processors and causes the computer device to implement the method for recognizing the video clip.

A computer readable storage medium is provided, the computer readable storage medium having stored thereon at least one computer program which is loaded and executed by a processor of a computer device and causes the computer device to implement the method for recognizing the video clip.

BRIEF DESCRIPTION OF THE DRAWINGS

FIG. 1 is a schematic diagram of an implementation environment of a method for recognizing a video clip provided in an embodiment of this application;

FIG. 2 is a flowchart of a method for recognizing a video clip provided in an embodiment of this application;

DESCRIPTION OF EMBODIMENTS

Figure 3:
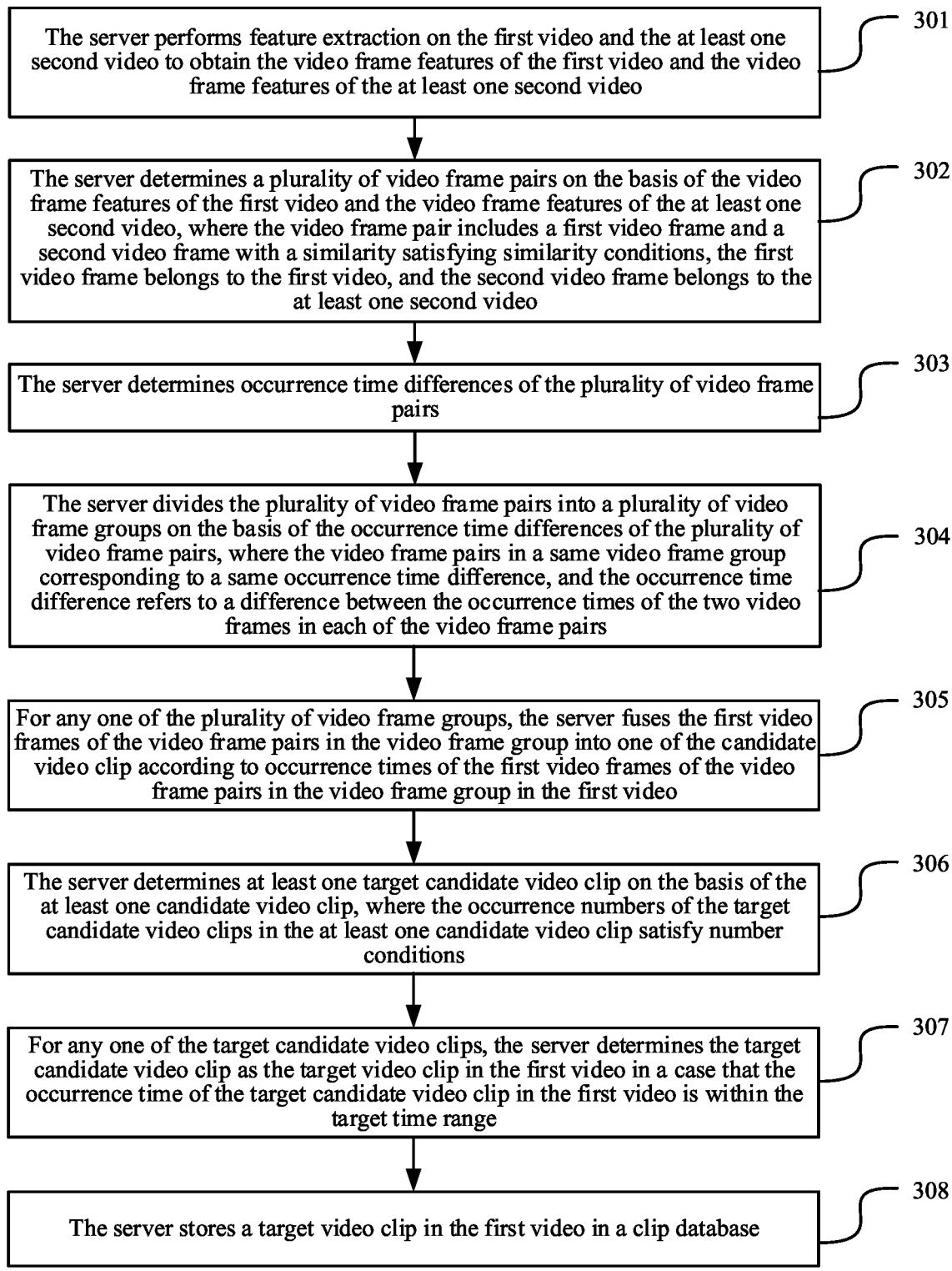
FIG. 3 is a flowchart of a method for recognizing a video clip provided in an embodiment of this application.

Terms such as "first" and "second" in this application are used to distinguish the same or similar items that have the substantially same effect and function. It is to be understood that there is no logical or temporal dependency among "first", "second" and "nth", and there are no limitations on a number and an execution order either.

Artificial intelligence (AI) is a theory, method, technology and application system that utilizes a digital computer or a machine controlled by the digital computer to simulate, extend and expand human intelligence, perceive an environment, acquire knowledge, and obtain optimal results by using the knowledge.

Machine learning (ML) is a multi-field and interdisciplinary subject involving to various subjects such as probability theory, statistics, approximation theory, convex analysis, and algorithm complexity theory. It is used for specialized research on how a computer simulates or implements a human learning behavior to acquire new knowledge or skills and reorganizes existing knowledge sub-models to continuously improve their performances.

Hamming distance: it is used to measure a distance between binary features, and the distance is achieved by counting the number of feature bits with different values, for example, a Hamming distance between (1000) and (0011) is 3.

Information (including, but not limited to user equipment information and user personal information), data (including, but not limited to data for analysis, stored data, and displayed data) and signals involved in this application are all authorized by a user or fully authorized by all parties, and the collection, use and processing of relevant data are required to comply with relevant laws, regulations and standards in relevant countries and regions.

FIG. 1 is a schematic diagram of an implementation environment of a method for recognizing a video clip provided in an embodiment of this application. With reference to FIG. 1, a terminal 110 and a server 140 may be included in the implementation environment.

The terminal 110 is connected to the server 140 by a wireless or wired network. Optionally, the terminal 110 is a vehicle-mounted terminal, a smart phone, a tablet computer, a notebook computer, a desktop computer, a smart speaker box, a smart watch, a smart television, etc., but is not limited thereto. An application supporting video clip recognition is installed to run on the terminal 110.

The server 140 is an independent physical server, or a server cluster or distributed system composed of a plurality of physical servers, or a cloud server providing basic cloud computation service such as cloud service, a cloud database, cloud computation, a cloud function, cloud storage, network service, cloud communication, middleware service, domain name service, security service, a content delivery network (CDN), and a big data and artificial intelligence platform. The server 140 provides background service for the application running on the terminal 110.

In embodiments of this application, the number of the terminal 110 and the number of the server 140 are not limited.

After the implementation environment in the embodiments of this application is introduced, application scenarios in the embodiments of this application are to be described in conjunction with the above-mentioned implementation environment. In the following description, a terminal is also the terminal 110 in the above-mentioned implementation environment, and a server is also the server 140 in the above-mentioned implementation environment.

The method for recognizing the video clip provided in the embodiments of this application can be applied to a scenario where an opening and an ending of a video are recognized, such as a scenario where an opening and an ending of a television play are recognized, or a scenario where an opening and an ending of a documentary film are recognized, or a scenario where an opening and an ending of a short video set are recognized.

As an example of the application of the method for recognizing the video clip provided in the embodiments of this application to the scenario where the opening and the ending of the television play are recognized, a technician selects, by a terminal, a television play of which an opening and an ending are required to be recognized, the television play includes a plurality of videos, and each video is an episode of the television play. When the television play is selected by the terminal, the server can perform processing on the basis of the plurality of videos in the television play by adopting a technical solution provided in each of the embodiments of this application to obtain openings and endings of the plurality of videos. In a process of processing the plurality of videos, the server determines a plurality of video frame pairs on the basis of video frame features of a first video and video frame features of at least one second video, each video frame pair includes a first video frame and a second video frame with a similarity satisfying similarity conditions, the first video frame belongs to the first video, and the second video frame belongs to the at least one second video, that is, each video frame pair includes a video frame in the first video and a video frame in each of the second videos, and both of the first video and the at least one second video belong to the plurality of videos. The server fuses the first video frames in the plurality of video frame pairs on the basis of occurrence time differences of the plurality of video frame pairs to obtain at least one candidate video clip in the first video, the occurrence time difference refers to a difference between occurrence times of the two video frames in each of the video frame pairs in the videos, i.e. a difference between an occurrence time of the first video frame in the video frame pair in the first video and an occurrence time of the second video frame in each of the second videos. The server determines at least one target video clip in the first video on the basis of the at least one candidate video clip and a target time range. Due to an application in a scenario where an opening and an ending of a television play are recognized, the target time period is also a time period when the opening or the ending is located, and the determined target video clip is also the opening or the ending of the first video.

The above description is based on an example in which the method for recognizing the video clip provided in the embodiments of this application is applied to a scenario where the opening and the ending of the television play are recognized, implementation processes of the above-mentioned other application scenarios fall within the same inventive concept as the above-mentioned description, and therefore, the descriptions thereof are not to be repeated herein.

In addition, the method for recognizing the video clip provided in the embodiments of this application can also be applied to a scenario where openings and endings of other types of videos are recognized in addition to the above-mentioned scenario where an opening and an ending of a television play are recognized, the scenario where an opening and an ending of a documentary film are recognized, and the scenario where an opening and an ending of a short video set are recognized, which is not limited in the embodiments of this application.

After the implementation environment and application scenarios in the embodiments of this application are introduced, the method for recognizing the video clip provided in the embodiments of this application is to be described as follows. With reference to FIG. 2, the technical solutions provided in the embodiments of this application can be executed by a computer device, wherein the computer device is executed by a terminal or a server, and the technical solutions provided in the embodiments of this application can also be executed jointly by the terminal and the server. In the following embodiments of this application, an execution subject is to be described with the server as an example. It is easy to understand that the following embodiments are to be described with the server as an example, however, various embodiments of this application may be executed by the terminal. That is, the technical solution provided in each of the embodiments of this application is actually executed by the computer device.

The method for recognizing the video clip includes the following steps:

Step 201: A server acquires video frame features of a first video and video frame features of at least one second video, and determines a plurality of video frame pairs on the basis of the video frame features of the first video and the video frame features of the at least one second video, wherein the video frame pair includes a first video frame and a second video frame with a similarity satisfying similarity conditions, the first video frame belongs to the first video, and the second video frame belongs to the at least one second video.

The first video and the at least one second video belong to the same video set, for example, the first video and the second videos are different episodes of the same television play. The video frame features are embedding features of video frames, such as deep Hash features. The similarity between the first video frame and the second video frame is determined by the video frame features of the first video frame and the video frame features of the second video frame. Each video frame pair includes a first video frame and a second video frame, and the similarity between the first video frame and the second video frame in the video frame pair satisfies the similarity conditions, that is, the first video frame and the second video frame in the video frame pair are two video frames with a higher similarity.

Step 202: The server fuses the first video frames in the plurality of video frame pairs on the basis of occurrence time differences of the plurality of video frame pairs to obtain at least one candidate video clip in the first video, wherein the occurrence time difference refers to a difference between occurrence times of the two video frames in each of the video frame pairs in the videos.

The first video frame in the video frame pair is a video frame having a higher similarity with the second video frame, and the candidate video clip is obtained by fusing the first video frames in the plurality of video frame pairs, and therefore, the candidate video clip is also a video clip, having a content overlapping with that in the at least one second video, in the first video. The occurrence time difference can reflect a difference between an occurrence time of the first video frame in the first video and an occurrence time of the second video frame in each of the second videos.

Step 203: The server acquires a target time range, and determines at least one target video clip in the first video on the basis of the at least one candidate video clip and the target time range, wherein the target video clips are within the target time range of the first video.

The target time range refers to a time range in the videos, and the target time range is set by a person skilled in the art according to actual situations, and is not limited in the embodiments of this application.

According to the technical solutions provided in the embodiments of this application, the video frame pairs including similar video frames are determined on the basis of the similarity between the video frame features. The first video frames in the video frame pairs are fused on the basis of the occurrence time differences to obtain the at least one candidate video clip. Finally, the target video clips within the target time range are determined from the at least one candidate video clip. The process of determining the target clips can be automatically performed, without human intervention, by a computer device directly on the basis of the first video and the at least one second video so as to be higher in efficiency.

The method for recognizing the video clip provided in the embodiments of this application has been simply introduced in above-mentioned steps 201 to 203, and the method for recognizing the video clip provided in the embodiments of this application is to be described in more detail below in conjunction with some examples. With reference to FIG. 3, the technical solutions provided in the embodiments of this application may be executed by a terminal or a server, and may also be executed jointly by the terminal and the server. In the embodiments of this application, an execution subject is to be described with the server as an example, and the method includes:

Step 301: The server performs feature extraction on the first video and the at least one second video to obtain the video frame features of the first video and the video frame features of the at least one second video.

In one of possible implementations, the server inputs the first video and the at least one second video into a feature extraction model and performs feature extraction on the first video and the at least one second video by the feature extraction model to obtain the video frame features of the first video and the video frame features of the at least one second video.

A process that the server performs feature extraction on the first video and the at least one second video by the feature extraction model is also a process that feature extraction is performed on the first video frame of the first video and the second video frame of each of the second videos, and in this case, the feature extraction model is an image feature extraction model.

In this implementation, feature extraction is performed on the first video and the at least one second video by the feature extraction model to obtain the video frame features of the first video and the video frame features of the at least one second video, so that abstract expression for the first video and the at least one second video is achieved, and the subsequent operation efficiency is increased.

In order to describe the above-mentioned implementation, three examples are given as follows for describing the above-mentioned implementation.

Example 1: The server inputs the first video and the at least one second video into the feature extraction model, and performs convolution and pooling on a plurality of first video frames and a plurality of second video frames by the feature extraction model to obtain video frame features of the plurality of first video frames and video frame features of the plurality of second video frames, wherein the plurality of first video frames are the video frame features of the first video, and the plurality of second video frames are the video frame features of the at least one second video.

A method for performing feature extraction on the first video by a server is to be described as follows: the server inputs the plurality of first video frames of the first video into the feature extraction model, and the plurality of first video frames are convolved by a convolutional layer of the feature extraction model to obtain a feature map of the plurality of first video frames. The server performs maximum pooling or average pooling on the feature maps of the plurality of first video frames through a pooling layer of the feature extraction model to obtain the video frame features of the plurality of first video frames. In some embodiments, the server represents the first video frames in a form of a matrix, represents the video frame features in a form of vectors, and implements convolution on the first video frames by sliding convolution kernels on the first video frames.

In some embodiments, the feature extraction model is a feature extractor based on a convolutional neural network (CNN), such as a neural network Resnet-101 (a residual network 101) pre-trained on a large-scale open-source data set imagenet, a structure of the neural network Resnet 101 refers to table 1. An output result of a pooling layer of the neural network Resnet-101 is a video frame feature, wherein 101 refers to the number of layers of the model, and the video frame feature is a vector of 1×2048.

TABLE 1

| Layer name | Output size | ResNet-101 | |
|---|---|---|---|
| Conv1 | 300 × 500 | 7 × 7, 64, stride 2 | |
| Conv2_x | 150 × 250 | 3 × 3 max pool, stride 2 | |
| | | 1 × 1, 64 | ×3 |
| | | 3 × 3, 64 | blocks |
| | | 1 × 1, 256 | |
| Conv3_x | 76 × 126 | 1 × 1, 128 | ×4 |
| | | 3 × 3, 128 | blocks |
| | | 1 × 1, 512 | |
| Conv4_x | 38 × 63 | 1 × 1, 256 | ×23 |
| | | 3 × 3, 256 | blocks |
| | | 1 × 1, 1024 | |
| Conv5_x | 19 × 32 | 1 × 1, 512 | ×3 |
| | | 3 × 3, 512 | blocks |
| | | 1 × 1, 2048 | |
| Pool | 1 × 2048 | Max pool | |
| Class | 1 × 1000 | full connection | |

Layer name is a name of each layer in the feature extraction model ResNet-101, Output size is a size of an outputted feature map, max pool refers to maximum pooling, stride refers to a step size, blocks refer to layers, one layer may include a plurality of convolution kernels, Cony refers to a convolutional layer, Pool refers to a pooling layer, Class refers to a class layer, and full connection refers to full connection. In the above-mentioned process of extracting the video frame features, the class layer is not used.

The above-mentioned feature extraction model is exemplified as ResNet-101. In other possible implementations, the feature extraction model may be further of other structures, and is not limited in the embodiments of this application.

In addition, the above-mentioned feature extraction process is implemented on the basis of convolution, and the obtained video frame features are used to express features of image textures of the video frames, and such video frame features are also referred to as low-level features of the video frames. In other possible implementations, the feature extraction model can further extract semantic features of the video frames, and the obtained video frame features can reflect semantics of the video frames, and a method for extracting the semantic features of the video frames by a server by virtue of the feature extraction model is to be described as follows.

Example 2: The server inputs the first video and the at least one second video into the feature extraction model, and encodes the plurality of first video frames and the plurality of second video frames on the basis of an attention mechanism by the feature extraction model to obtain the video frame features of the plurality of first video frames and the video frame features of the plurality of the second video frames, wherein the plurality of first video frames are video frames of the first video, the plurality of second video frames are video frames of the at least one second video, and the video frame features acquired by the feature extraction model are also the semantic features of the corresponding video frames. In this implementation, the feature extraction model is a semantic feature encoder, such as a Transformer encoder.

A method for performing feature extraction on a plurality of first videos by a server is to be described as follows: the server inputs a plurality of first video frames of the first videos into the feature extraction model, and performs embedded encoding on the plurality of first video frames by the feature extraction model to obtain a plurality of embedded vectors, wherein one of the embedded vectors corresponds to one of the first video frames, and the embedded vectors are used to represent positions of the first video frames in the first videos and contents of the first video frames. The server inputs the plurality of embedded vectors into the feature extraction model, and performs linear transformation on the plurality of embedded vectors by three linear transformation matrices of the feature extraction model to obtain a query vector, a key vector and a value vector corresponding to each first video frame. The server acquires attention weights of the plurality of first video frames by the feature extraction model on the basis of query vectors and key vectors corresponding to the plurality of first video frames. The server acquires an attention encoding vector of each first video frame by the feature extraction model on the basis of the attention weight and the value vector of each first video frame, wherein the attention encoding vector is also a video frame feature of each first video frame.

For example, the server multiplies each embedded vector with the three linear transformation matrices respectively by the feature extraction model to obtain a query vector, a key vector and a value vector respectively corresponding to each first video frame. For the first one of the plurality of first video frames, the server determines a plurality of attention weights of a first first video frame in the plurality of first video frames by the feature extraction model on the basis of a query vector of the first first video frame in the plurality of first video frames and key vectors of the plurality of first video frames. For the first first video frame in the plurality of first video frames, the server performs weighted summation on the attention weights of the first first video frame in the plurality of first video frames and value vectors of the plurality of first video frames by the feature extraction model to obtain an attention encoding vector of the first first video frame, i.e., a video frame feature of the first first video frame.

Above-mentioned examples 1 and 2 are respectively described with an example in which the low-level features and the semantic features of the video frames are extracted by the feature extraction model. In other implementations, the server may also acquire the low-level features and the semantic features of the video frames at the same time by the feature extraction model, which is described as follows with example 3.

Example 3: The server inputs the first video and the at least one second video into the feature extraction model, and performs convolution and pooling on the plurality of first video frames and the plurality of second video frames by the feature extraction model to obtain low-level features of the plurality of first video frames and low-level features of the plurality of second video frames, wherein the plurality of first video frames are video frames of the first video, and the plurality of second video frames are video frames of the at least one second video. The server encodes the plurality of first video frames and the plurality of second video frames by the feature extraction model on the basis of an attention mechanism to obtain semantic features of the plurality of first video frames and semantic features of the plurality of second video frames. The server fuses the low-level feature and the semantic feature of each first video frame to obtain the video frame feature of each first video frame. The server fuses the low-level feature and the semantic feature of each second video frame to obtain the video frame feature of each second video frame.

For example, the feature extraction model includes a first sub-model for extracting the low-level features of the video frames and a second sub-model for extracting the semantic features of the video frames. After inputting the first video and the at least one second video into the feature extraction model, the server acquires the low-level features of the plurality of first video frames and the low-level features of the plurality of second video frames by the first sub-model, and acquires the semantic features of the plurality of first video frames and the semantic features of the plurality of second video frames by the second sub-model. When the server fuses the low-level feature and the semantic feature of each video frame, a weighted summation method may be adopted, and a weight of the weighted summation is set by a person skilled in the art according to actual situations, for example, it is set as 0.5, which is not limited in the embodiments of this application. A method for acquiring the low-level features and the semantic features of the video frames by the server by virtue of the first sub-model and the second sub-model is based on the same principle with above-mentioned examples 1 and 2, respectively, and therefore, the descriptions thereof are not to be repeated herein.

The above-mentioned description is based on an example in which the low-level features and the semantic features of the video frames are extracted by the feature extraction model. With the development of science and technologies, the server may also acquire the video frame features by adopting feature extraction models with other structures, which is not limited in the embodiments of this application.

In some embodiments, the first video and the at least one second video are videos belonging to the same video set, wherein the first video is a video of a target video clip to be determined, and the at least one second video is each video other than the first video in the video set, or the at least one second video is a video extracted from the video set, and the first video is shielded during extraction. The server randomly extracts the second videos having the same number as target videos from the video set when the at least one second video is the video extracted from the video set, and the first video is shielded during extraction, that is, the first video is not included in the extracted second videos having the same number as the target videos, and the number of the target videos is set by a person skilled in the art according to actual situations and is not limited in the embodiments of this application. The first video and the at least one second video are respectively formed into at least one video pair by the server, and each video pair includes the first video and a second video in the at least one second video.

For example, when the video set includes 46 videos, for each first video i, the server randomly extracts 10 second videos r from the remaining videos in the video set, and respectively forms 10 video pairs from the first video i and the 10 second videos r, and the processing is performed in units of video pairs during subsequent processing, wherein 10 is also the number of the target videos.

In addition, in some embodiments, before performing feature extraction on the first video and the at least one second video, the server extracts frames from the first video and the at least one second video to obtain the plurality of first video frames of the first video and the plurality of second video frames of each of the second videos. By extracting the frames from the videos, the operation amount of a subsequent feature extraction process can be reduced, and the efficiency of feature extraction can be increased.

Figure 4:
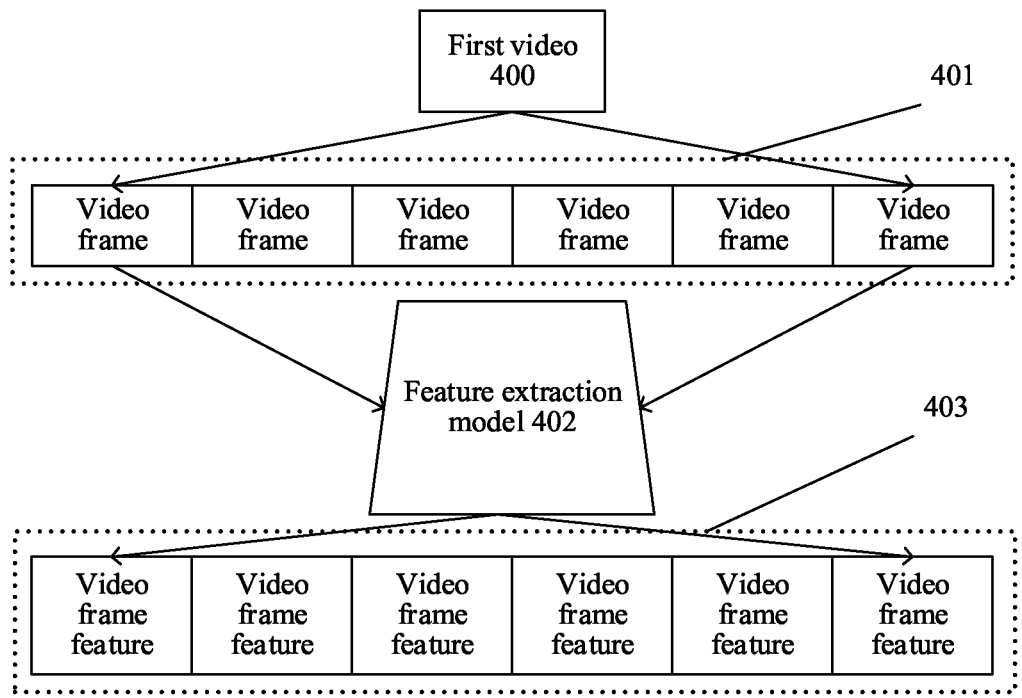
FIG. 4 is a flowchart of a method for extracting video frame features provided in an embodiment of this application.

With the first video as an example, the server extracts frames from the first video at a target interval to obtain the plurality of first video frames of the first video, wherein the target interval refers to a target playing duration of the first video, such as 1s; or the target interval refers to a target number of frame intervals, such as 25 frames. The server extracts a frame as a first video frame from the first video every target play duration when the target interval refers to the target play duration of the first video. The server extracts 6 first video frames from the first video when the duration of the first video is 6s and the target play duration is 1s. The server extracts a frame from the first video every target number of video frames to obtain a plurality of first video frames when the target time interval refers to the target number of frame intervals. The server extracts 10 first video frames from the first video when the first video includes 100 video frames and the target number is 10. For example, with reference to FIG. 4, the server extracts frames from a first video 400 at a target interval to obtain a plurality of first video frames 401 of the first video. The server inputs the plurality of first video frames 401 of the first video into a feature extraction model 402, and outputs video frame features 403 of the plurality of first video frames 401 by the feature extraction model 402.

Above-mentioned step 301 is an exemplary step, and may be performed by the server in advance or when the server executes the technical solutions provided in the embodiments of this application, which is not limited in the embodiments of this application.

Step 302: The server determines a plurality of video frame pairs on the basis of the video frame features of the first video and the video frame features of the at least one second video, wherein the video frame pair includes a first video frame and a second video frame with a similarity satisfying similarity conditions, the first video frame belongs to the first video, and the second video frame belongs to the at least one second video.

In one of possible implementations, the server determines the similarity between video frame features of a plurality of first video frames and video frame features of a plurality of second video frames. The server determines the first video frame and the second video frame with the similarity satisfying the similarity conditions as one video frame pair, and each video frame pair includes one first video frame and one second video frame.

The similarity between the video frame features is represented by a Euclidean distance or a cosine similarity, which is not limited in the embodiments of this application.

In this implementation, the server may determine a plurality of video frame pairs on the basis of the similarity between the first video frame and the second video frame. Since the video frames in the video frame pairs are video frames with a higher similarity in different videos, similar video clips may be rapidly determined subsequently on the basis of the video frame pairs, and finally, a target video clip is determined with a higher efficiency.

The server determines a Euclidean distance between each of the video frame features of the plurality of first video frames and each of the video frame features of the plurality of second video frames when the similarity is the Euclidean distance. The server determines the first video frame and the second video frame between which the Euclidean distance is smaller than or equal to a distance threshold as a video frame pair. The distance threshold is set by a person skilled in the art according to actual situations, and is not limited in the embodiments of this application. The server determines the first video frame and the second video frame as a video frame pair when the distance threshold is 0.5 or the Euclidean distance between the video frame feature of any first video frame and the video frame feature of any second video frame is smaller than or equal to 0.5.

The server determines a cosine similarity between each of the video frame features of the plurality of first video frames and each of the video frame features of the plurality of second video frames when the similarity is the cosine similarity. The server determines a first video frame and a second video frame between which the cosine similarity is greater than or equal to a similarity threshold as a video frame pair. The server determines the first video frame and the second video frame as a video frame pair when the cosine similarity is 0.8 or the cosine similarity between the video frame feature of any first video frame and the video frame feature of any second video frame is greater than or equal to 0.8.

In some embodiments, the server determines the similarity between each of the video frame features of the first video and each of the video frame features of the second videos in the video pair in a unit of video pairs when the first video and the at least one second video are formed into at least one video pair by the server, thereby determining a plurality of video frame pairs in the video pair. For example, for a video pair (i, r), the server determines a similarity between video frame features of a first video i and video frame features of a second video r. The server determines a first video frame and a second video frame with a similarity satisfying target conditions as a video frame pair. That is, for each first video frame j in the first video i, a Euclidean distance between video frame features of the first video frame j and each second video frame in the second video r is determined. The server takes a second video frame having a Euclidean distance smaller than to as a similar frame of the first video frame j, and the first video frame j and the similar frame form a video frame pair. The server stores the acquired similar frame of the first video frame j into a first list which is also referred to as a sim-id-list. In some embodiments, the server stores identifiers of frames in the first list, the identifiers of the frames are used to indicate a video to which the frames belong and positions of the frames in the video. For example, for a first video frame j=1, the sim-id-list is [1, 2, 3], which indicates that video frames corresponding to the $1^{st}$, $2^{nd}$ and $3^{rd}$ seconds of the second video r are similar frames, wherein j=1 indicates the video frame corresponding to the 1st second in the first video.

In one of the embodiments, the plurality of video frame pairs are determined on the basis of the video frame features of the first video and the video frame features of the at least one second video, which includes the following steps: acquire a video set, and take a video including a target video clip to be determined in the video set as the first video; take at least one video different from the first video in the video set as the at least one second video; respectively form at least one video pair from the first video and the at least one second video into, wherein the video pair includes the first video and a second video in the at least one second video; calculate a similarity between the video frame features of the first video and the second video in the same video pair to obtain a similarity calculation result; take a first video frame and a second video frame with a similarity satisfying similarity conditions in the same video pair as a video frame pair according to the similarity calculation result, wherein the first video frame belongs to the first video and the second video frame belongs to the at least one second video.

Optionally, after step 302, it is determined by the server that no target video clip is present in the first video when the number of the determined video frame pairs is zero.

Step 303: The server determines occurrence time differences of the plurality of video frame pairs.

In one of possible implementations, the server subtracts second occurrence times of the second video frames from first occurrence times of the first video frames in the plurality of video frame pairs to obtain occurrence time differences of the plurality of video frame pairs. In some embodiments, the server stores the occurrence time differences of the plurality of video frame pairs into a second list which is also referred to as an occurrence time difference list diff-time-list, and the corresponding occurrence time differences may be called directly from the second list during subsequent processing. For example, for the first video frame j=1, when a similar frame list sim-id-list is [1, 2, 3], a corresponding occurrence time difference list diff-time-list is [0, 1, 2].

Step 304: The server divides the plurality of video frame pairs into a plurality of video frame groups on the basis of the occurrence time differences of the plurality of video frame pairs, wherein the video frame pairs in a same video frame group corresponding to a same occurrence time difference, and the occurrence time difference refers to a difference between the occurrence times of the two video frames in each of the video frame pairs.

In one of possible implementations, for any one of the plurality of video frame pairs, the server determines a first occurrence time of the first video frame and a second occurrence time of the second video frame in the video frame pair, wherein the first occurrence time refers to an occurrence time of the first video frame in the first video, and the second occurrence time refers to an occurrence time of the second video frame in the second video; the server subtracts the second occurrence time of the second video frame from the first occurrence time of the first video frame in the video frame pair to obtain an occurrence time difference of the video frame pair; and the server divides the video frame pairs with a same occurrence time difference into an initial video frame group, and takes the occurrence time difference of the video frame pairs in the initial video frame group as the occurrence time difference corresponding to the initial video frame group. The sever fuses the plurality of initial video frame groups on the basis of the occurrence time differences corresponding to the plurality of initial video frame groups to obtain the plurality of video frame groups.

The initial video frame group includes a plurality of video frame pairs with the same occurrence time difference, and the different initial video frame groups correspond to different occurrence time differences, wherein the occurrence time difference corresponding to the initial video frame group refers to the occurrence time difference of the video frame pairs in the initial video frame group.

In one of possible implementations, before the plurality of video frame pairs are divided into the plurality of video frame groups on the basis of the occurrence time differences of the plurality of video frame pairs, the above-mentioned method further includes the following steps: for any one of the plurality of video frame pairs, subtract the second occurrence time of the second video frame in the video frame pair from the first occurrence time of the first video frame in the video frame pair to obtain an occurrence time difference of the video frame pair, wherein the first occurrence time refers to an occurrence time of the first video frame in the first video, and the second occurrence time refers to an occurrence time of the second video frame in the second video.

In this implementation, the video frames having the same occurrence time difference in the video frame pair may constitute a complete video clip. By aggregating the video frame pairs into the video frame groups, the subsequent determination of similar video clips is facilitated.

For example, the server acquires pre-set configuration information, and sorts the plurality of initial video frame groups according to a target order in the configuration information; and for any two adjacent candidate video frame groups in a plurality of candidate video frame groups, the two adjacent candidate video frame groups are fused into one video frame group when a match time difference of the two adjacent candidate video frame groups satisfies match time difference conditions, wherein the match time difference refers to a difference between occurrence time differences corresponding to the two adjacent candidate video frame groups.

The server sorts the plurality of initial video frame groups according to the target order in the pre-set configuration information to obtain a plurality of candidate video frame groups. The server fuses the two adjacent candidate video frame groups into one video frame group when a match time difference of the two adjacent candidate video frame groups satisfies match time difference conditions, wherein the match time difference refers to a difference between occurrence time differences corresponding to the two adjacent candidate video frame groups.

In order to describe the technical process described in the above-mentioned examples more clearly, the above-mentioned examples are to be further described as follows in two parts.

Part 1: The server sorts the plurality of initial video frame groups according to the target order to obtain the plurality of candidate video frame groups.

In one of possible implementations, the server sorts the plurality of initial video frame groups according to an order in which the corresponding occurrence time differences are from small to large to obtain the plurality of candidate video frame groups. In this case, the target order refers to an order in which the occurrence time differences are from large to small. In some embodiments, in any initial video frame group, the server sorts the first video frames according to an order of the occurrence times of the first video frames in the video frame pair in the first video frames.

In this implementation, the server sorts the plurality of initial video frame groups according to an order from large to small, and in the obtained plurality of candidate video frame groups, the occurrence time differences corresponding to any two candidate video frame groups are closer, which facilitates a subsequent fusion process.

For example, the plurality of initial video frame groups are [3, 5], [11, 12], [2, 4], [4, 6], [6, 9], [7, 10] and [10, 11], wherein each bracket represents a video frame pair [i, r], the previous digit in the bracket is an identifier of the first video frame i, and the second digit is an identifier of the second video frame r, and the identities are occurrence times of the video frames in the video. For the video frame pair [3, 5], the occurrence time difference is expressed as 5−3=2, and for the video frame pair [6, 9], the occurrence time difference is expressed as 9−6=3. The server sorts the plurality of initial video frame groups according to an order in which the corresponding occurrence time differences are from small to large to obtain a plurality of candidate video frame groups [10, 11], [11, 12], [2, 4], [3, 5], [4, 6], [6, 9], and [7, 10].

In one of possible implementations, the server sorts the plurality of initial video frame groups according to an order in which the corresponding occurrence time differences are from small to large to obtain the plurality of candidate video frame groups. In this case, the target order refers to an order in which the occurrence time differences are from small to large. In some embodiments, in any initial video frame group, the server sorts the first video frames according to an order of the occurrence times of the first video frames in the video frame pair in the first video frames.

In this implementation, the server sorts the plurality of initial video frame groups according to an order from small to large, and in the obtained plurality of candidate video frame groups, the occurrence time differences corresponding to any two candidate video frame groups are closer, which facilitates a subsequent fusion process.

In some embodiments, the server generates a third list on the basis of the first list and the second list when the first list is used to store video frame pairs and the second list is used to store occurrence time differences, wherein the third list is used to store video frame pairs and occurrence time differences, and the third list can store a plurality of initial video frame groups, for example, the third list is in a form of a third list (match-dt-list): {d: {count, start-id, match-id-list}, . . . }, where d represents an occurrence time difference, d: {count, start-id, match-id-list} represents an initial video frame group of which the occurrence time difference is d, count represents the number of video frame pairs in the initial video frame group, start-id represents the minimum identifier of a first video frame, and match-id-list represents a video frame pair.

Part 2: The server fuses the two adjacent candidate video frame groups into one video frame group when a match time difference between any two adjacent candidate video frame groups in the plurality of candidate video frame groups satisfies match time difference conditions.

In one of possible implementations, the two adjacent candidate video frame groups include a first candidate video frame group and a second candidate video frame group, and the server adds the video frame pairs in the first candidate video frame group to the second candidate video frame group to obtain the video frame group when a match time difference between an occurrence time difference corresponding to the first candidate video frame group and an occurrence time difference corresponding to the second candidate video frame group is smaller than or equal to a match difference threshold.

A plurality of iteration processes are included in the process that the plurality of candidate video frame groups are fused into a plurality of video frame groups. After the first candidate video frame group and the second candidate video frame group are fused into a video frame group, the server may further determine a match time difference between the newly fused video frame group and a next candidate video frame group. The newly fused video frame group and the next candidate video frame group are fused again when the match time difference satisfies the match time difference conditions, the fusion process is based on the same inventive concept as the process of fusing the first candidate video frame group and with second candidate video frame group, and therefore, the implementation process thereof is not to be repeated herein. Of course, the server determines a match time difference between the next candidate video frame group and each of the next two candidate video frame groups again when the match time difference does not satisfy the match time difference conditions, thereby performing further processing on the basis of the match time difference. The match difference threshold is set by a person skilled in the art according to actual situations, and is not limited in the embodiments of this application.

In this implementation, by fusing the candidate video frame groups on the basis of the occurrence time differences, the number of the candidate video frame groups can be reduced, so that the operation amount of subsequent processing can be reduced, and the operation efficiency can be increased.

In one of possible implementations, the two adjacent candidate video frame groups include a first candidate video frame group and a second candidate video frame group, and the two adjacent candidate video frame groups are fused into one video frame group, which includes the following steps: add the video frame pairs in the first candidate video frame group to the second candidate video frame group when a match time difference between the first candidate video frame group and the second candidate video frame group is smaller than or equal to a match difference threshold; and replace target second video frames with reference second video frames on the basis of an occurrence time difference corresponding to the second candidate video frame group to obtain the video frame group, wherein the target second video frames are second video frames newly added to the second candidate video frame group; the reference second video frames are second video frames in the second video which have occurrence time differences being a target difference with target first video frames; the target difference is an occurrence time difference corresponding to the second candidate video frame group; and the target first video frames are first video frames in video frame pairs to which the target second video frames belong.

For example, the server determines a match time difference between the first candidate video frame group and the second candidate video frame group. The server replaces target second video frames with reference second video frames on the basis of an occurrence time difference corresponding to the second candidate video frame group to obtain the video frame group when the match time difference is smaller than or equal to the match difference threshold, wherein the target second video frames are second video frames newly added to the second candidate video frame group, the reference second video frames are second video frames in the second video which have occurrence time differences being the occurrence time difference corresponding to the second candidate video frame group with target first video frames, and the target first video frames are first video frames in video frame pairs to which the target second video frames belong.

In this implementation, the server may further adjust the video frame pairs newly added to the second candidate video frame group according to the occurrence time difference of the second candidate video frame group after the video frame pairs in the first candidate video frame group are added to the second candidate video frame group, so that the occurrence time difference of the adjusted video frame pairs is the same as that of the second candidate video frame group, and the consistency between each of the occurrence time differences of the video frame pairs and each of the occurrence time differences of the video frame groups is maintained.

In order to make the description clearer, the following description is based on an example in which the occurrence time difference corresponding to the first candidate video frame group including two video frame pairs [6, 9] and [7, 10] is 3, the occurrence time difference corresponding to the second candidate video frame group including three video frame pairs [2, 4], [3, 5] and [4, 6] is 2, and the match difference threshold is 3. Since the match time difference between the first candidate video frame group and the second candidate video frame group is 1, the server has to merge the first candidate video frame group and the second candidate video frame group when it is determined that the match time difference is smaller than the match difference threshold. The server adds the two video frame pairs [6, 9] and [7, 10] in the first candidate video frame group to the second candidate video frame group, and thus, the second candidate video frame group becomes [2, 4], [3, 5], [4, 6], [6, 9] and [7, 10]. Since the occurrence time difference corresponding to the second candidate video frame group is 2, the server adjusts the second video frames in the two video frame pairs [6, 9] and [7, 10] added to the second candidate video frame group on the basis of the occurrence time difference 2 to obtain two new video frame pairs [6, 8] and [7, 9]. After the second video frames newly added to the second candidate video frame group are adjusted, the second candidate video frame group becomes [2, 4], [3, 5], [4, 6], [6, 8] and [7, 9], and the occurrence time difference of each video frame pair is 2.

The above description is based on an example in which the server adds the video frame pairs in the first candidate video frame group to the second candidate video frame group. In other possible implementations, the server may also add the video frame pairs in the second candidate video frame group to the first candidate video frame group.

In some embodiments, the server determines whether to add the video frame pairs in the first candidate video frame group to the second candidate video frame group or to add the video frame pairs in the second candidate video frame group to the first candidate video frame group on the basis of the number of the video frame pairs in the first candidate video frame group and the second candidate video frame group. For example, the server adds the video frame pairs in the second candidate video frame group to the first candidate video frame group when the number of the video frame pairs in the first candidate video frame group is larger than the number of the video frame pairs in the second candidate video frame group. The server adds the video frame pairs in the first candidate video frame group to the second candidate video frame group when the number of the video frame pairs in the second candidate video frame group is larger than the number of the video frame pairs in the first candidate video frame group. The server adds the video frame pairs in the first candidate video frame group to the second candidate video frame group when the number of the video frame pairs in the second candidate video frame group is equal to the number of the video frame pairs in the first candidate video frame group. Or, the server adds the video frame pairs in the second candidate video frame group to the first candidate video frame group when the number of the video frame pairs in the second candidate video frame group is equal to the number of the video frame pairs in the first candidate video frame group.

In this case, the server may determine a way of merging the candidate video frame groups according to the number of the video frame pairs in the candidate video frame groups, and add the candidate video frame groups including a smaller number of video frames to the video frame groups including a larger number of video frames, so that the operation amount is reduced, and the efficiency is increased.

Step 305: For any one of the plurality of video frame groups, the server fuses the first video frames of the video frame pairs in the video frame group into one of the candidate video clips according to occurrence times of the first video frames of the video frame pairs in the video frame group in the first video.

In one of possible implementations, the server compares occurrence times of first video frames of any two adjacent video frame pairs in the video frame group in the first video to obtain an occurrence time difference between the two adjacent video frame pairs. The server adds the two adjacent video frame pairs to a temporary frame list when a difference between occurrence times of the first video frames of the two adjacent video frame pairs in the first video satisfies the occurrence time conditions. The server fuses the video frame pairs in the temporary frame list into a reference video clip when the difference between the occurrence times of the first video frames of the two adjacent video frame pairs in the first video does not satisfy the occurrence time conditions. The server determines at least one candidate video clip on the basis of a plurality of reference video clips.

The temporary frame list is used to store video frame pairs of which the occurrence times have a difference satisfying the occurrence time conditions. In some embodiments, the difference between the occurrence times satisfies the occurrence time conditions, which means that the difference between the occurrence times is smaller than or equal to an occurrence time difference threshold, and the occurrence time difference threshold is set by a person skilled in the art according to actual situations, for example, it is set as 8s, which is not limited in the embodiments of this application.

In order to describe the above-mentioned implementation more clearly, the above-mentioned implementation is to be further described as follows in four parts.

Part 1: The server compares occurrence times of first video frames of any two adjacent video frame pairs in the video frame group in the first video.

In some embodiments, the server takes the occurrence times of the first video frames in the first video as identifiers of the first video frames and takes the occurrence times of the second video frames in the second videos as identifiers of the second video frames. In this case, the server compares the identifiers of the two first video frames when the occurrence times of the first video frames of any two adjacent video frame pairs in the first video are compared. For example, the server sequentially compares the occurrence times of the first video frames of the video frame pairs in the first video when the video frame group includes video frame pairs [2, 4], [3, 5], [4, 6], [6, 8], and [7, 9]. During first comparison, the server compares occurrence times of the first video frame 2 of the first video frame pair [2, 4] and the first video frame 3 of the second video frame pair [3, 5] in the first video.

Part 2: The server adds the two adjacent video frame pairs to a temporary frame list when a difference between occurrence times of the first video frames of the two adjacent video frame pairs in the first video satisfies the occurrence time conditions.

In one of possible implementations, the server adds the two adjacent video frame pairs to a temporary frame list when a difference between occurrence times of the first video frames of the two adjacent video frame pairs in the first video is smaller than or equal to an occurrence time difference threshold. For example, the video frame pairs [2, 4], [3, 5], [4, 6], [6, 8], and [7, 9] in the video frame group are also described as an example, for the video frame pairs [2, 4] and [3, 5], an occurrence time difference of the first video frames in [2, 4] and [3, 5] in the first video is expressed as 3−2=1 when the occurrence time difference threshold is 3, and therefore, the server adds the two video frame pairs to the temporary frame list (Tmplist), wherein Tmplist=[[2, 4], [3, 5]].

A plurality of iteration processes are included in the process that the server adds the video frames to the temporary frame list. In any one of the iteration processes, the server compares an occurrence time difference of first video frames of the current video frame pair and the previous video frame pair in the first video, wherein the current video frame pair refers to a video frame pair being processed currently, and the previous video frame pair refers to a video frame pair processed in a previous iteration process. For example, after adding the video frame pairs [2, 4] and [3, 5] to the temporary frame list, the server further determines a relationship between the occurrence time difference of the first video frames of the video frame pairs [3, 5] and [4, 6] in the first video and the occurrence time difference threshold. The occurrence time difference of the first video frames in [3, 5] and [4, 6] in the first video is 4−3=1, and therefore, the server adds the video frame pair [4, 6] to the temporary frame list (Tmplist), wherein Tmplist=[[2, 4], [3, 5], [4, 6]]. Due to the plurality of iteration processes, the temporary frame list Tmplist=[[2, 4], [3, 5], [4, 6], [6, 8], and [7, 9]] is obtained.

Part 3: The server fuses the video frame pairs in the temporary frame list into a reference video clip when the difference between the occurrence times of the first video frames of the two adjacent video frame pairs in the first video does not satisfy the occurrence time conditions.

The reference video clip includes a first subclip and a second subclip, the first subclip is composed of the first video frames in the video frame pairs, and the second subclip is composed of second video frames in the video frame pairs.

Figure 5:
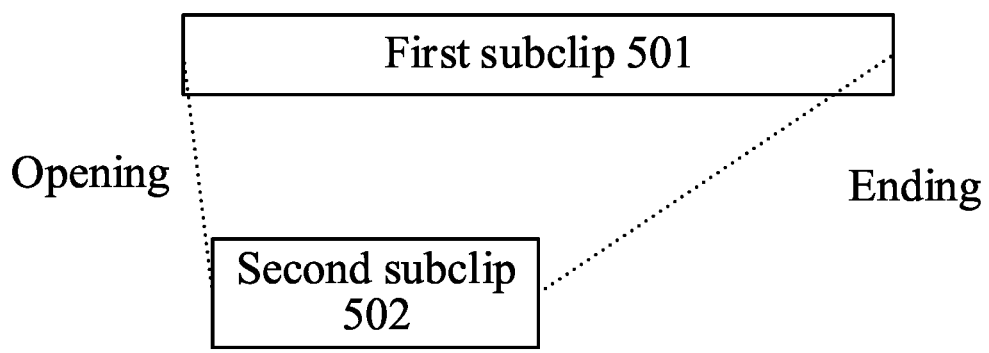
FIG. 5 is a schematic diagram of a first subclip and a second subclip provided in an embodiment of this application.

In one of possible implementations, the server fuses the first video frames in the temporary frame list into the first subclip and fuses the second video frames in the temporary frame list into the second subclip when the difference between the occurrence times of the first video frames of the two adjacent video frame pairs in the first video is larger than the occurrence time difference threshold, and the first subclip and the second subclip form the reference video clip. The first video frames and the second video frames in the video frame pairs are video frames with a higher similarity, and therefore, the first subclip and the second subclip are also clips with a higher similarity. For example, with reference to FIG. 5, a first subclip 501 and a second subclip 502 are shown, the first video frame at the beginning of the first subclip 501 and the first video frame at the beginning of the second subclip 502 form a video frame pair, and the first video frame at the end of the first subclip 501 and the first video frame at the end of the second subclip 502 form another video frame pair. In some embodiments, the first subclip and the second subclip in a reference video clip are also referred to as match durations.

For example, the server fuses the first video frames in the temporary frame list into a reference video clip when the two adjacent video frame pairs are [9, 11] and [2, 4], and the difference between the occurrence times of the first video frames of the two video frame pairs in the first video is 9−2=7. For example, the server fuses the first video frames [2,], [3,], [4,], [6,], and [7,] in the temporary frame list into a first subclip (2, 7), and fuses the second video frames [, 4],

[, 5], [, 6], [, 8], and [, 9] in the temporary frame list into a second subclip (4, 9) when the temporary frame list Tmplist=[[2, 4], [3, 5], [4, 6], [6, 8], [7, 9]], and the first subclip (2, 7) and the second subclip (4, 9) form the reference video clip (2, 7, 4, 9), wherein the reference video clip is in a format of (src-startTime, src-endTime, ref-startTime, ref-endTime); src-startTime refers to the beginning of the first subclip, i.e. the first video frame with the minimum serial number in the temporary frame list; src-endTime refers to the end of the first subclip, i.e. the first video frame with the maximum serial number in the temporary frame list; ref-startTime refers to the beginning of the second subclip, i.e. the second video frame with the minimum serial number in the temporary frame list; ref-endTime refers to the end of the second subclip, i.e. the second video frame with the maximum serial number in the temporary frame list; the serial number refers to an identifier of a video frame and indicates a position of the video frame in the video; the smaller the serial number is, the closer the position of the video frame in the video is to the front; and the smaller the serial number is, the closer the position of the video frame in the video is to the rear. In some embodiments, the server stores the reference video clip in the matching segment list match-duration-list. Since all the video frames of the first video and the second videos are traversed when a video frame pair is determined, the situation that a certain video frame is similar to a plurality of video frames may occur, and thus, the situation that there are two reference video clips temporally overlapping in the match-duration-list occurs.

In some embodiments, the video frame pairs in the video frame group are traversed, and a current video frame pair which is traversed currently and a previous video frame pair which is traversed previously are determined; the current video frame pair and the previous video frame pair are two adjacent video frame pairs in the video frame group; occurrence times of first video frames of the current video frame pair and the previous video frame pair in the first video are compared to obtain a difference between the occurrence times of the first video frames; the current video frame pair and the previous video frame pair are added to a temporary frame list when the difference between the occurrence times of the first video frames satisfies occurrence time conditions; the video frame pairs in the temporary frame list are fused into a reference video clip when the difference between the occurrence times of the first video frames does not satisfy the occurrence time conditions, and the temporary frame list is emptied after the fusing; a next traversed video frame pair is determined, the next traversed video frame pair is taken as a new current video frame pair, and the operation of comparing occurrence times of first video frames of the current video frame pair and the previous video frame pair in the first video are continued to be performed until the last traversed video frame pair, the video frame pairs in the temporary frame list are fused into a candidate video clip when there are the video frame pairs in the temporary frame list; and the at least one candidate video clip is determined on the basis of a plurality of reference video clips. The difference of the occurrence times of the first video frames refers to the difference of the occurrence times of the first video frames of the two adjacent video frame pairs in the video frame group in the first video. In some embodiments, information such as an occurrence time difference corresponding to the first subclip, a duration of the first subclip and the number of the video frames included in the first subclip may also be carried by the reference video clip so as to be called by the server.

In addition, in addition to the way provided in part 3, an embodiment of this application provides another method of triggering the fusion of the video frame pairs in the temporary frame list into the reference video clip.

In one of possible implementations, the server adds the video frame pair to the temporary frame list, and fuses the video frame pair in the temporary frame list into the reference video frame clip when the currently processed video frame pair is the last video frame pair in the video frame group. For example, when the video frame group includes five video frame pairs [2, 4], [3, 5], [4, 6], [6, 8], and [7, 9], and the server processes the video frame pair [7, 9], since the video frame pair [7, 9] is the last video frame pair in the video frame group, the server adds the video frame pair [7, 9] to the temporary frame list, and fuses the video frame pair in the temporary frame list into a reference video clip. The fusion process is described with reference to the description of above implementation, the descriptions thereof are not repeated herein.

Video frames with a smaller occurrence time difference may form a relatively complete video clip, and therefore, a relatively complete reference video may be obtained by fusing the video frames with the smaller occurrence time difference. Compared with a method for determining a target video clip by fragmented video frames, the embodiment of this application may facilitate subsequent determination of a more complete target video clip on the basis of the relatively complete reference video.

Part 4: The server determines at least one candidate video clip on the basis of a plurality of reference video clips.

The plurality of reference video clips include first overlapping video clips and/or second overlapping video clips, the first overlapping video clips refer to reference video clips belonging to first reference video clips in the plurality of reference video clips, and the second overlapping video clips refer to reference video clips partially overlapping with second reference video clips in the plurality of reference video clips.

The first overlapping video clips belong to the first reference video clips, which means that contents of the first overlapping video clips are completely included by the first reference video clips, or the first reference video clips completely include the first overlapping video clips.

In order to describe the above-mentioned content in part 4 more clearly, a method for determining the first overlapping video clips from the plurality of reference video clips by the server is to be described as follows.

In one of possible implementations, the server determines the first overlapping video clips from the plurality of reference video clips on the basis of occurrence times of first subclips in the plurality of reference video clips in the first video.

The first subclips are also video clips formed by the first video frames, and the occurrence times include starting times and ending times of the first subclips in the first video.

Figure 6:
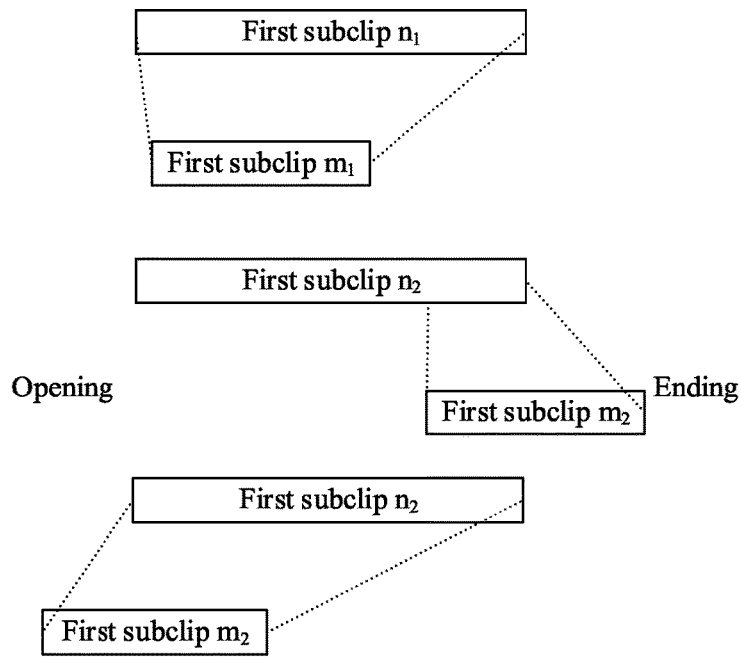
FIG. 6 is a schematic diagram of first subclips overlapping in different ways provided in an embodiment of this application.

For example, for a reference video clip $A_1$ and a reference video clip $B_1$ in the plurality of reference video clips, the server compares an occurrence time of a first subclip of the reference video clip $A_1$ in the first video with an occurrence time of a first subclip of the reference video clip $B_1$ in the first video, and determines the reference video clip $B_1$ as a first overlapping video clip when the occurrence time of the first subclip of the reference video clip $B_1$ in the first video is a subset of the occurrence time of the first subclip of the reference video clip $A_1$ in the first video. For example, with reference to FIG. 6, the plurality of reference video clips include a reference video clip $A_1$ and a reference video clip $B_1$, and the server compares an occurrence time of a first subclip $m_1$ of the reference video clip $A_1$ in the first video with an occurrence time of a first subclip $n_1$ of the reference video clip $B_1$ in the first video. The server determines the reference video clip $B_1$ as a first overlapping video clip and the reference video clip $A_1$ as the above-mentioned first reference video clip when the starting time of the first subclip $n_1$ is later than the starting time of the first subclip $m_1$ and the ending time of the first subclip $n_1$ is earlier than the ending time of the first subclip $m_1$.

A method for determining the second overlapping video clips from the plurality of reference video clips by the server is to be described as follows after the method for determining the first overlapping video clips from the plurality of reference video clips by the server is described.

In one of possible implementations, the server determines the second overlapping video clips from the plurality of reference video clips on the basis of occurrence times of first subclips in the plurality of reference video clips in the first video.

For example, for a reference video clip $A_2$ and a reference video clip $B_2$ in the plurality of reference video clips, the server compares an occurrence time of a first subclip of the reference video clip $A_2$ in the first video with an occurrence time of a first subclip of the reference video clip $B_2$ in the first video, and determines the reference video clip with a shorter duration in the reference video clip $A_2$ and a reference video clip $B_2$ as a second overlapping video clip when the occurrence time of the first subclip of the reference video clip $B_2$ in the first video is intersected with the occurrence time of the first subclip of the reference video clip $A_2$ in the first video. For example, with reference to FIG. 6, the plurality of reference video clips include a reference video clip $A_2$ and a reference video clip $B_2$, and the server compares an occurrence time of a first subclip $m_2$ of the reference video clip $A_2$ in the first video with an occurrence time of a first subclip $n_2$ of the reference video clip $B_2$ in the first video. The server determines the reference video clip $B_2$ as a second overlapping video clip and the reference video clip $A_2$ as the above-mentioned second reference video clip when the starting time of the first subclip $n_2$ is later than the starting time of the first subclip $m_2$ and earlier than the ending time thereof, and the ending time of the first subclip $n_2$ is later than the ending time of the first subclip $m_2$, or the starting time of the first subclip $n_2$ is earlier than the starting time of the first subclip $m_2$, and the ending time of the first subclip $n_2$ is earlier than the ending time of the first subclip $m_2$ and later than the starting time thereof, and a duration of the reference video clip $B_2$ is less than a duration of the reference video clip $A_2$.

The steps provided in part 4 are to be described as follows after the methods for determining the first overlapping video clips and the second overlapping video clips by the server are introduced.

In one of possible implementations, the server deletes the first overlapping video clips to obtain the at least one candidate video clip when the plurality of reference video clips include the first overlapping video clips.

In this implementation, the server may delete the repeated first overlapping video clips from the plurality of reference video clips, so that the number of the obtained candidate video clips is reduced, the operation amount is reduced, and the operation efficiency is increased.

In one of possible implementations, the server deletes overlapping parts of the second overlapping video clips and the second reference video clips to obtain the at least one candidate video clip when the plurality of reference video clips include the second overlapping video clips.

In this implementation, the server may delete the overlapping parts of the second overlapping video clips and the second reference video clips, so that the lengths of the obtained candidate video clips are reduced, the operation amount is reduced, and the operation efficiency is increased.

On the basis of the above-mentioned implementation, the server may further preform the following steps.

In some embodiments, the server compares durations of third reference video clips with a target duration after the overlapping parts of the second overlapping video clips and the second reference video clips are deleted, wherein the third reference video clips refer to the second overlapping video clips in which the overlapping parts are deleted. The server retains the third reference video clips when the durations of the third reference video clips are greater than or equal to the target duration. The server deletes the third reference video clips when the durations of the third reference video clips are less than or equal to the target duration.

The target duration is set by a person skilled in the art according to actual situations, and is not limited in the embodiments of this application. The case that the server retains the third reference video clips also means that the original second overlapping video clips are replaced with the third reference video clips.

The above-mentioned implementation is to be described as follows with two examples:

Example 1: For the reference video clip $A_2$ and the reference video clip $B_2$ in the plurality of reference video clips, the server moves the starting time of the first subclip $n_2$ to the ending time of the first subclip $m_2$ to obtain a subclip $l_1$ when the first subclip $m_2$ of the reference video clip $A_2$ partially overlaps with the first subclip $n_2$ of the reference video clip $B_2$, and the starting time of the first subclip $m_2$ is earlier than the starting time of the first subclip $n_2$, wherein the subclip $l_1$ is a first subclip of a third reference video clip. The server deletes the subclip $l_1$ and the third reference video clip to which the subclip $l_1$ belongs at the same time when a duration of the subclip $l_1$ is less than or equal to the target duration. The server retains the subclip $l_1$ and the third reference video clip to which the subclip $l_1$ belongs at the same time when the duration of the subclip $l_1$ is greater than the target duration.

Example 2: For the reference video clip $A_2$ and the reference video clip $B_2$ in the plurality of reference video clips, the server moves the ending time of the first subclip $n_2$ to the starting time of the first subclip $m_2$ to obtain a subclip $l_2$ when the first subclip $m_2$ of the reference video clip $A_2$ partially overlaps with the first subclip $n_2$ of the reference video clip $B_2$, and the starting time of the first subclip $n_2$ is earlier than the starting time of the first subclip $m_2$, wherein the subclip $l_2$ is a first subclip of a third reference video clip. The server deletes the subclip $l_2$ and the third reference video clip to which the subclip $l_2$ belongs at the same time when a duration of the subclip $l_2$ is less than or equal to the target duration. The server retains the subclip $l_2$ and the third reference video clip to which the subclip $l_2$ belongs at the same time when the duration of the subclip $l_2$ is greater than the target duration.

Since the third reference video clip may be considered to include a smaller number of video frames when a duration of the third reference video clip is less than the target duration, it may be a reference video clip generated by mistake. By deleting the reference video clip, the accuracy of a subsequent target video clip generated on the basis of the remaining reference video clips can be improved.

Step 306: The server determines at least one target candidate video clip on the basis of the at least one candidate video clip, wherein the occurrence numbers of the target candidate video clips in the at least one candidate video clip satisfy number conditions.

In one of possible implementations, the server determines at least one reference candidate video clip on the basis of the at least one candidate video clip. The server determines an occurrence number of each of the reference candidate video clips in the at least one reference candidate video clip. The server determines the reference candidate video clips with occurrence numbers satisfying occurrence number conditions as the target candidate video clips.

The occurrence number of each of the reference candidate video clips in the at least one reference candidate video clip refers to the number of the reference candidate video clips in the at least one reference candidate video clip. For example, when the at least one reference candidate video clip is 1, 2, 3, 1, 4, 5, the occurrence number of the reference candidate video clip 1 is 2.

In order to describe the above-mentioned implementation, three parts are divided as follows for describing the above-mentioned implementation.

Part 1: The server determines at least one reference candidate video clip on the basis of the at least one candidate video clip.

The at least one candidate video clip includes third overlapping video clips and/or fourth overlapping video clips, the third overlapping video clips refer to candidate video clips belonging to the first candidate video clips in the at least one candidate video clip, and the fourth overlapping video clips refer to candidate video clips partially overlapping with the second candidate video clips in the at least one candidate video clip.

In order to describe the above-mentioned content in part 1 more clearly, a method for determining the third overlapping video clips from the at least one candidate video clip by the server is to be described as follows.

In one of possible implementations, the server determines the third overlapping video clips from the at least one candidate video clip on the basis of occurrence times of first subclips of the at least one candidate video clip in the first video.

The candidate video clips include a first subclip and a second subclip, the first subclip is composed of the first video frames in the video frame pairs, and the second subclip is composed of the second video frames in the video frame pairs.

For example, the at least one candidate video clip is two candidate video clips. For a candidate video clip $C_1$ and a candidate video clip $D_1$ in the at least one candidate video clip, the server compares an occurrence time of a first subclip of the candidate video clip $C_1$ in the first video with an occurrence time of a first subclip of the candidate video clip $D_1$ in the first video, and determines the candidate video clip $D_1$ as a third overlapping video clip when the occurrence time of the first subclip of the candidate video clip $D_1$ in the first video is a subset of the occurrence time of the first subclip of the candidate video clip $C_1$ in the first video.

For example, the at least one candidate video clip is two candidate video clips including a candidate video clip $C_1$ and a candidate video clip $D_1$. The server compares an occurrence time of a first subclip $o_1$ of the candidate video clip $C_1$ in the first video with an occurrence time of a first subclip $p_1$ of the candidate video clip $D_1$ in the first video. The server determines the candidate video clip $D_1$ as a third overlapping video clip and the candidate video clip $C_1$ as the above-mentioned first candidate video clip when the starting time of the first subclip $p_1$ is later than the starting time of the first subclip $o_1$, and the ending time of the first subclip $p_1$ is earlier than the ending time of the first subclip $o_1$.

A method for determining the fourth overlapping video clips from the at least one candidate video clip by the server is to be described as follows after the method for determining the third overlapping video clips from the at least one candidate video clip by the server is described.

In one of possible implementations, the server determines the fourth overlapping video clips from the at least one candidate video clip on the basis of occurrence times of first subclips of the at least one candidate video clip in the first video.

For example, the at least one candidate video clip is two candidate video clips. For a candidate video clip $C_2$ and a candidate video clip $D_2$ in the at least one candidate video clip, the server compares an occurrence time of a first subclip $o_2$ the candidate video clip $C_2$ in the first video with an occurrence time of a first subclip of the candidate video clip $D_2$ in the first video, and determines that the candidate video clip with a shorter duration in the candidate video clip $C_2$ and a candidate video clip $D_2$ as a fourth overlapping video clip when the occurrence time of the first subclip of the candidate video clip $D_2$ in the first video is intersected with the occurrence time of the first subclip of the candidate video clip $C_2$ in the first video.

For example, the at least one candidate video clip is two candidate video clips including a candidate video clip $C_2$ and a candidate video clip $D_2$. The server compares an occurrence time of a first subclip $o_2$ of the candidate video clip $C_2$ in the first video with an occurrence time of a first subclip $p_2$ of the candidate video clip $D_2$ in the first video. The server determines the candidate video clip $D_2$ as a fourth overlapping video clip and the candidate video clip $C_2$ as the above-mentioned second candidate video clip when the starting time of the first subclip $p_2$ is later than the starting time of the first subclip $o_2$ and earlier than the ending time thereof, and the ending time of the first subclip $p_2$ is later than the ending time of the first subclip $o_2$, or the starting time of the first subclip $p_2$ is earlier than the starting time of the first subclip $o_2$, and the ending time of the first subclip $p_2$ is earlier than the ending time of the first subclip $o_2$ and later than the starting time thereof, and a duration of the candidate video clip $D_2$ is less than a duration of the candidate video clip $C_2$.

The steps provided in part 1 are to be described as follows after the methods for determining the third overlapping video clips and the fourth overlapping video clips by the server are introduced.

In one of possible implementations, the server deletes the third overlapping video clips to obtain the at least one reference candidate video clip when the at least one candidate video clip includes the third overlapping video clips. In some embodiments, the server superimposes the occurrence numbers of the third overlapping video clips to the first candidate video clips before deleting the third overlapping video clips. Since the third overlapping video clips are completely included by the first candidate video clips, a weight of the first candidate video clips during subsequent processing can be increased by superimposing the occurrence numbers of the third overlapping video clips to the first candidate video clips.

In this implementation, the server may delete the repeated third overlapping video clips from the least one candidate video clip, so that the number of the obtained reference candidate video clips is reduced, the operation amount is reduced, and the operation efficiency is increased.

A specific example is described as follows.

The server deletes the first subclip $o_1$ and the candidate video clip $D_1$ at the same time, and superimposes the occurrence number of the candidate video clip $D_1$ to the candidate video clip $C_1$ when the first subclip $o_1$ of the candidate video clip $D_1$ is a subset of the first subclip $p_1$ of the candidate video clip $C_1$, and the duration of the first subclip $o_1$ is greater than 0.5 times as great as the duration of the first subclip $p_1$.

On the basis of the above-mentioned implementation, the server may further determine durations of the third overlapping video clips and durations of the first candidate video clips, and determine whether to superimpose the occurrence numbers of the third overlapping video clips to the first candidate video clips according to the durations of the third overlapping video clips and the durations of the first candidate video clips before superimposing the occurrence numbers of the third overlapping video clips to the first candidate video clips.

For example, the server determines the durations of the third overlapping video clips and the durations of the first candidate video clips. The server determines first ratios of the durations of the third overlapping video clips to the durations of the first candidate video clips and superimposes the occurrence numbers of the third overlapping video clips to the first candidate video clips when the first ratios are larger than or equal to a ratio threshold; and the server does not superimpose the occurrence numbers of the third overlapping video clips to the first candidate video clips when the first ratios are smaller than the ratio threshold, wherein the ratio threshold is set by a person skilled in the art according to actual situations, for example, it is set as 0.5, which is not limited in the embodiments of this application.

In one of possible implementations, the server determines occurrence numbers of the fourth overlapping video clips when the at least one candidate video clip includes the fourth overlapping video clips and overlap ratios of the fourth overlapping video clips to the second candidate video clips satisfy overlap ratio conditions. The server determines the at least one reference candidate video clip on the basis of the occurrence numbers of the fourth overlapping video clips with the overlap ratios satisfying the overlap ratio conditions.

The overlap ratios refer to ratios of durations of overlapping video clips to durations of compared video clips. For example, for the fourth overlapping video clips and the second candidate video clips, the second candidate video clips are the compared video clips, and the overlap ratios of the fourth overlapping video clips to the second candidate video clips may be determined by dividing durations of the second candidate video clips by durations of overlapping video clips between the fourth overlapping video clips and the second candidate video clips. The overlap ratios satisfy the overlap ratio conditions, which means that the overlap ratios are larger than or equal to an overlap ratio threshold.

A method for determining the at least one reference candidate video clip by the server on the basis of the occurrence times of the fourth overlapping video clips in the above-mentioned implementation is to be described as follows with two implementations.

Implementation 1: The server fuses the fourth overlapping video clips with the second candidate video clips to obtain the at least one reference candidate video clip when the occurrence numbers of the fourth overlapping video clips are larger than or equal to a first occurrence number threshold. In some embodiments, each of the fourth overlapping video clips and the corresponding second candidate video clip with an overlap ratio satisfying the overlap ratio conditions are fused to obtain the at least one reference candidate video clip. In some embodiments, the server superimposes the occurrence numbers of the fourth overlapping video clips to the second candidate video clips before fusing the fourth overlapping video clips with the second candidate video clips.

The first occurrence number threshold is set by a person skilled in the art according to actual situations, for example, it is set as 3, which is not limited in the embodiments of this application. The occurrence numbers of the fourth overlapping video clips are larger than or equal to a first occurrence number threshold, which means that the fourth overlapping video clips are non-negligible and need to be further processed, so that the accuracy of acquiring the target video clip is improved.

A method for fusing the fourth overlapping video clips with the second candidate video clips by the server in the above-mentioned implementation is to be described as follows.

Figure 7:
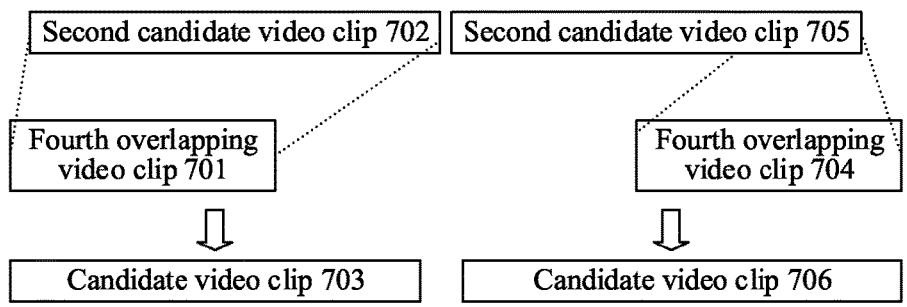
FIG. 7 is a schematic diagram of fusion of candidate video clips provided in an embodiment of this application.

In some embodiments, an example in which the durations of the fourth overlapping video clips are less than the durations of the second candidate video clips is described. The server deletes parts overlapping with the second candidate video clips from the fourth overlapping video clips and adds remaining parts to the second candidate video clips to obtain a candidate video clip. For example, with reference to FIG. 7, a duration of a fourth overlapping video clip 701 is less than a duration of a second candidate video clip 702, and a duration of a fourth overlapping video clip 704 is less than a duration of a second candidate video clip 705. The server fuses the fourth overlapping video clip 701 with the second candidate video clip 702 to obtain a candidate video clip 703 when the ending time of the fourth overlapping video clip 701 is later than the ending time of the second candidate video clip 702. The server fuses the fourth overlapping video clip 704 with the second candidate video clip 705 to obtain a candidate video clip 706 when the starting time of the fourth overlapping video clip 704 is earlier than the starting time of the second candidate video clip 705.

By fusing the fourth overlapping video clips with the second candidate video clips, the number of the video clips can be reduced, so that the operation amount is reduced, and the operation efficiency is increased.

Implementation 2: The server deletes the fourth overlapping video clips to obtain the at least one reference candidate video clip when the occurrence numbers of the fourth overlapping video clips are smaller than the first occurrence number threshold. The server superimposes the occurrence numbers of the fourth overlapping video clips to the second candidate video clips.

The occurrence numbers are smaller than the first occurrence number threshold, which indicates that the fourth overlapping video clips are negligible and may be deleted by the server.

By deleting parts of the fourth overlapping video clips, the number of the video clips can be reduced, so that the operation amount is reduced, and the operation efficiency is increased.

In one of possible implementations, the server deletes the fourth overlapping video clips to obtain the at least one reference candidate video clip when the at least one candidate video clip includes the fourth overlapping video clips and the overlap ratios of the fourth overlapping video clips and the second candidate video clips do not satisfy the overlap ratio conditions. In some embodiments, the server superimposes the occurrence numbers of the fourth overlapping video clips to the second candidate video clips before deleting the fourth overlapping video clips.

In one of possible implementations, the server deletes the fourth overlapping video clips to obtain the at least one reference candidate video clip when the at least one candidate video clip includes the fourth overlapping video clips and the durations of the fourth overlapping video clips are less than the durations of the second candidate video clips. In some embodiments, the server superimposes the occurrence numbers of the fourth overlapping video clips to the second candidate video clips before deleting the fourth overlapping video clips.

In some embodiments, the at least one reference candidate video clip is stored in a match-list by the server so as to be conveniently called.

By deleting the fourth overlapping video clips with the overlap ratios not satisfying the overlap ratio conditions and the durations being less than the durations of the second candidate video clips, the number of the video clips can be reduced, so that the operation amount is reduced, and the operation efficiency is increased.

Part 2: The server determines occurrence numbers of the reference candidate video clips in the at least one reference candidate video clip.

By the above-mentioned processing in part 1, the server determines at least one reference candidate video clip on the basis of at least one candidate video clip, mergence and deletion of the occurrence times are involved during determination, and the server redetermines the occurrence time of the at least one reference candidate video clip. In some embodiments, the occurrence time of the at least one reference candidate video clip may be stored into a count-list by the server so as to be called.

For example, the server adopts three second videos for mining when the target video clips in the first video are determined. In order to facilitate description, the first video is named as i, and the three second videos are named as vid1, vid2, and vid3, respectively. After the above-mentioned steps are adopted, the server determines two candidate video clips [(2, 7, 4, 9), (10, 11, 11, 12)] on the basis of the first video i and the second video vid1, determines a candidate video clip [(2, 7, 4, 9)] on the basis of the first video i and the second video vid2, and determines a candidate video clip [(2, 7, 4, 10)] on the basis of the first video i and the second video vid3. The server performs statistics on the four candidate video clips, and determines that the occurrence number of the candidate video clip (2, 7, 4, 9) is 2, the occurrence number of (2, 7, 4, 10) is 1, and the occurrence number of (10, 11, 11, 12) is 1. After the four candidate video clips are fused in the above-mentioned way in part 1, two reference candidate video clips [(2, 7, 4, 9), (10, 11, 11, 12)] are obtained, and the occurrence number of the reference candidate video clip (2, 7, 4, 9) is 3, and the occurrence number of the reference candidate video clip (10, 11, 11, 12) is 1. In a case of storage in count-list, count-list=[3, 1].

Part 3: The server determines the reference candidate video clips with occurrence numbers satisfying occurrence number conditions as the target candidate video clips.

In one of possible implementations, the server determines the reference candidate video clips with occurrence numbers larger than or equal to a second occurrence number threshold as the target candidate video clips.

In some embodiments, the second occurrence number threshold is positively related to the number of the at least one reference candidate video clip, that is, the greater the number of the at least one reference candidate video clip, the greater the second occurrence number threshold; the smaller the number of the at least one reference candidate video clip, the smaller the second occurrence number threshold. In some embodiments, the second occurrence number threshold is a product of a target ratio and the number of the at least one reference candidate video clip, the target ratio is a positive number smaller than 1.

For example, the server deletes a reference candidate video clip (10, 11, 11, 12), and finally retains a reference candidate video clip (2, 7, 4, 9) and the occurrence number which is 3 when the two reference candidate video clips [(2, 7, 4, 9), (10, 11, 11, 12)] are obtained, and the occurrence number of the reference candidate video clip (2, 7, 4, 9) is 3, the occurrence number of the reference candidate video clip (10, 11, 11, 12) is 1, and the second occurrence number threshold is 3. During storage in the match-list and the count-list, match-list=(2, 7, 4, 9), and count-list=[3].

Step 307: For any one of the target candidate video clips, the server determines the target candidate video clip as the target video clip in the first video when the occurrence time of the target candidate video clip in the first video is within the target time range.

The target time range is set by a person skilled in the art according to actual situations, for example, the target time range is a time range within which an opening and an ending of a video may be present when the technical solutions provided in the embodiments of this application are applied to a scenario of recognizing the opening and the ending of the video. In this case, the target time range includes a first time range and a second time range, the first time range is a range within which the opening may be present, and the second time range is a range within which the ending may be present. For example, the first ⅕ time of the video is set to be an opening time, i.e., the first time range; and the last ⅕ time is set to be an ending time, i.e., the second time range. For a 10-minute video, it is set that the opening may only occur in the first two minutes and the ending occurs in the last two minutes. ⅕ is set by a person skilled in the art according to actual situations, and corresponding adjustment can be made for different types of videos, for example, ⅕ can be taken for a Children's animation lasting for about 15 minutes, and ⅛ can be taken for a television play, i.e., a 45-minute long video.

Above-mentioned steps 301 to 307 are described with an example in which the server determines the target video clip in the first video. When the first video and the at least one second video belong to a same video set, the server can determine target video clips of other videos in the video set by adopting a method similar to above-mentioned steps 301 to 307, wherein other videos refer to videos other than the first video.

The technical solutions provided in the embodiments of this application are to be described below in conjunction with FIG. 8.

Figure 8:
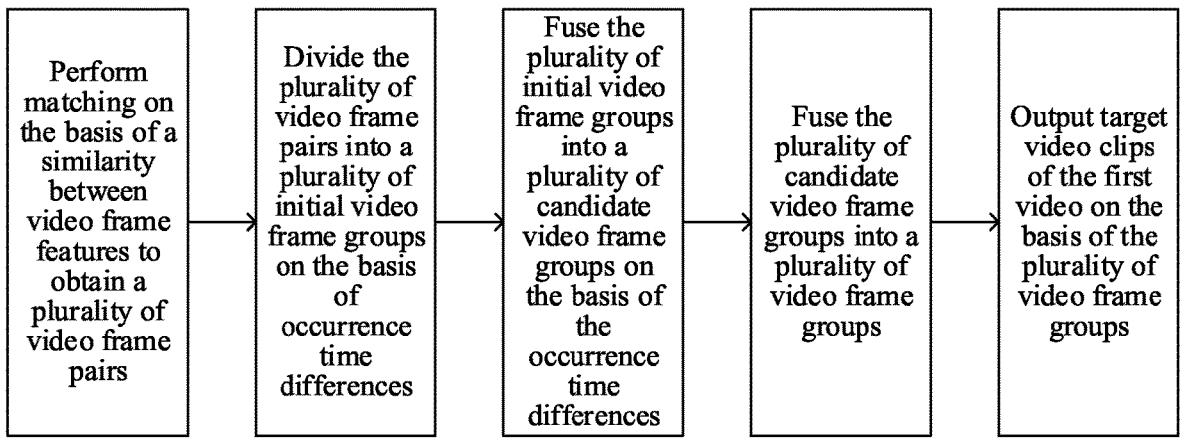
FIG. 8 is a flowchart of a method for recognizing a video clip provided in an embodiment of this application.

With reference to FIG. 8, in the embodiments of this application, the server performs matching on the basis of a similarity between video frame features to obtain a plurality of video frame pairs. The server divides the plurality of video frame pairs into a plurality of initial video frame groups on the basis of occurrence time differences. The server fuses the plurality of initial video frame groups into a plurality of candidate video frame groups on the basis of the occurrence time differences. The server fuses the plurality of candidate video frame groups into a plurality of video frame groups. The server outputs target video clips of the first video on the basis of the plurality of video frame groups.

Figure 9:
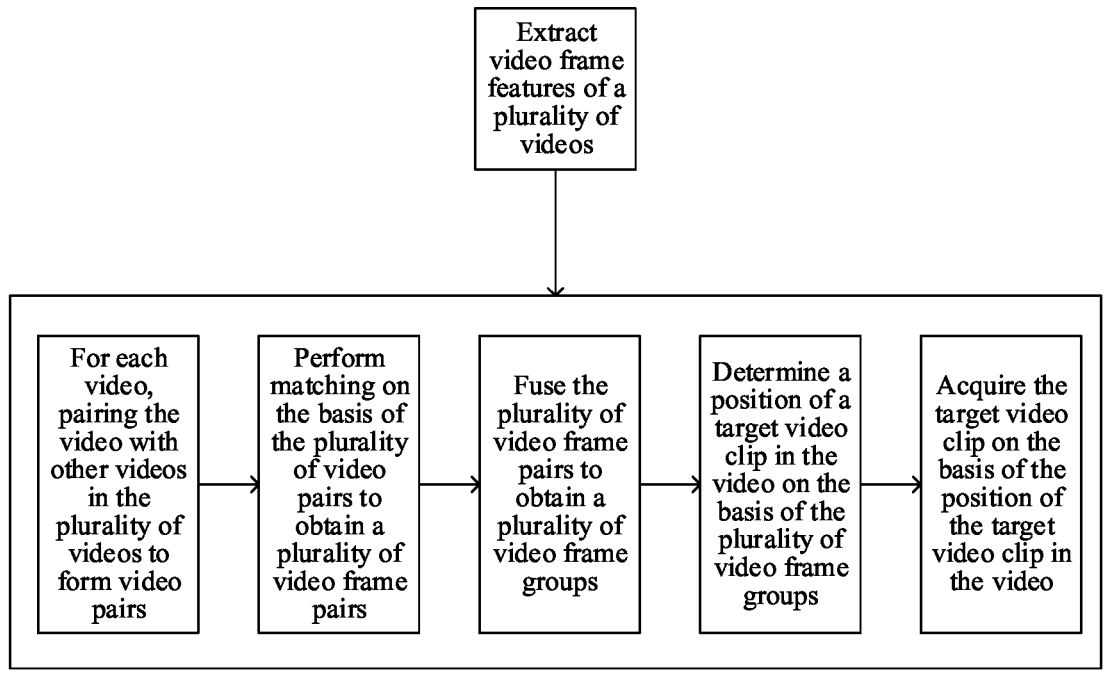
FIG. 9 is a flowchart of a video clip mining system provided in an embodiment of this application.

In some embodiments, above-mentioned steps 301 to 307 are implemented by a clip mining system. The clip mining system is also an opening and ending mining system when the technical solutions provided in the embodiments of this application are applied to a scenario where an opening and an ending of a video are recognized. With reference to FIG. 9, the video clip mining system provides the following functions. Video frame features of a plurality of videos are extracted. For each video, the video is paired with other videos in the plurality of videos to form video pairs. Matching is performed on the basis of the plurality of video pairs to obtain a plurality of video frame pairs. The plurality of video frame pairs are fused to obtain a plurality of video frame groups. A position of a target video clip in the video is determined on the basis of the plurality of video frame groups. The target video clip is acquired on the basis of the position of the target video clip in the video. The target video clip is also the opening or ending of the video when the technical solutions provided in the embodiments of this application are applied to the scenario where the opening and the ending of the video are recognized.

Figure 10:
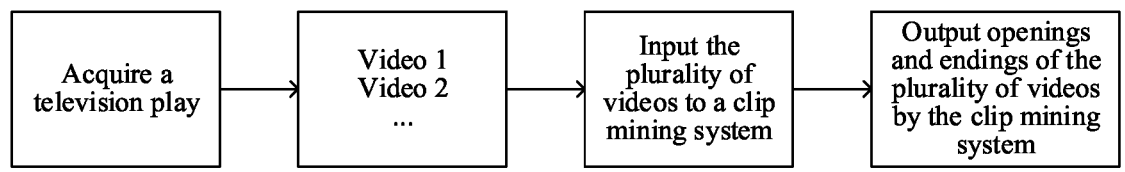
FIG. 10 is a flowchart of a method for acquiring an opening and an ending of a television play provided in an embodiment of this application.

With reference to FIG. 10, a television play is acquired when the technical solutions provided in the embodiments of this application are applied to the scenario where the opening and the ending of the video are recognized, wherein the television play includes a plurality of videos. The plurality of videos are inputted to a clip mining system, and openings and endings of the plurality of videos are outputted by the clip mining system. In some embodiments, the clip mining system may output timestamps of the openings and endings of the plurality of videos.

Step 308: The server stores a target video clip in the first video in a clip database.

In one of possible implementations, the server performs feature extraction on the target video clip of the first video to obtain video frame features of the target video clips. The server stores the video frame features of the target video clip in the clip database. In some embodiments, the server associates the video frame features of the target video clip with the first video, for example, the server sets identifiers of the video frame features of the target video clip as an identifier of the first video. The server associates the identifier of the first video with an identifier of a certain video set to facilitate a subsequent query process when the first video belongs to the video.

The process of performing feature extraction on the target video clip to obtain the video frame features of the target video clip is based on the same inventive concept as above-mentioned step 301, and the implementation process thereof is described with reference to the description of above-mentioned step 301, the descriptions thereof are not repeated herein.

Figure 11:
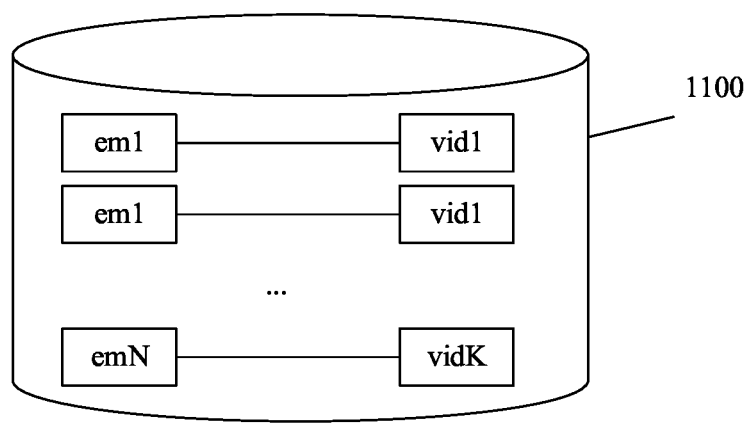
FIG. 11 is a schematic diagram of a storage mode of a clip database provided in an embodiment of this application.

For example, the target video clip is (2, 7), the server acquires a target video clip corresponding to 2-7 seconds from the first video, and extracts a plurality of reference video frames from the target video clip. The server performs feature extraction on the plurality of reference video frames to obtain video frame features of the plurality of reference video frames. The server stores the video frame features of the plurality of reference video frames in the clip database. The server associates the video frame features of the plurality of reference video frames with an identifier Vid1 of the first video, and associates the identifier Vid1 of the first video with an identifier Cid1 of a video set to which the first video belongs. FIG. 11 shows a storage mode of a clip database. With reference to FIG. 11, in a database 1100, em1-emN are video frame features, vid1-vidK are identifiers of different videos, and N and K are both positive integers.

After storing the target video clip of the first video in the clip database, the server may also perform video clip retrieval by using the clip database, wherein the method is described as follows:

In one of possible implementations, the server performs feature extraction on a plurality of target video frames of a target video to be recognized to obtain video frame features of the plurality of target video frames. The server determines at least one target video clip of the target video on the basis of the video frame features of the plurality of the target video frames, the video frame features of the first video frames, and the video frame features of the at least one second video.

In some embodiments, the process that the server performs feature extraction on the plurality of target video frames of the target video to obtain the video frame features of the plurality of target video frames is based on the same inventive concept as above-mentioned step 301, and the implementation process thereof is described with reference to the description of above-mentioned step 301, the descriptions thereof are not repeated herein. The process that the server determines the at least one target video clip of the target video on the basis of the video frame features of the plurality of the target video frames, the video frame features of the first video frames, and the video frame features of the at least one second video is based on the same inventive concept as above-mentioned steps 302 to 307, and the implementation process thereof is described with reference to the description of above-mentioned steps 302 to 307, the descriptions thereof are not repeated herein. In some embodiments, the video clip retrieval in the clip database is implemented by a video retrieval system. In some embodiments, the video frame features of the first video frame and the video frame features of the at least one second video are stored in the clip database.

By the design of a time period matching algorithm, a similar video clip matching method based on image embedding features is implemented, and it can support similar video clip matching with length change (which is embodied in a matching logic, and the merged frames are not required to be continuous front and back when matched frames are merged as a time period under the same occurrence time difference) and position change (which is embodied in a matching logic, the position is not changed when the occurrence time difference is 0, and the position may be changed when the occurrence time difference is larger than 0). This method is little in time consumption and excellent in performance.

By using an opening and ending mining scheme based on a video time period matching method, recognition and positioning of an opening and an ending of a complex video with complex length change and position change can be implemented, and a difficult situation that cannot be solved in an existing scheme can be solved.

With the combination of opening and ending retrieval schemes based on time period matching, a real-time (within 10 minutes) opening and ending mining scheme which is application-friendly can be implemented.

The above-mentioned method for recognizing the video clip can be applied to a scenario where the opening and the ending of the video clip are recognized, and can also be applied to a scenario where an infringing video is recognized, and these two application scenarios are to be respectively described as follows.

When the retrieval method for the video clip is applied to a scenario where the opening and the ending of the video clip are retrieved, the target video to be recognized is inputted to the video retrieval system, the video retrieval system performs feature extraction on the target video to obtain the video frame features of the plurality of target video frames. By means of the video retrieval system, matching is performed in the clip database on the basis of the video frame features of the plurality of target video frames to obtain the target video clip in the target video, and the target video clip is also the opening or ending of the target video.

The description is based on an example in which an opening and an ending of a newly updated video in a television play are recognized. For example, 10 episodes of the television play have been updated, openings and endings of the 10 episodes are acquired by above-mentioned steps 301 to 307, and the openings and the endings of the 10 episodes are stored in the clip database by above-mentioned step 308. When the eleventh episode of the television play is updated, the eleventh episode is used as the target video, the target video is inputted to the video retrieval system, the video retrieval system performs feature extraction on the target video to obtain the video frame features of the plurality of target video frames. By means of the video retrieval system, matching is performed in the clip database on the basis of the video frame features of the plurality of target video frames to obtain the target video clip in the target video, and the target video clip is also the opening or ending of the target video. Matching can be performed within a limited range on the basis of the identifier of the video set when the video frame features are associated with the identifier of the video and the identifier of the video set in the clip database, and thus, the efficiency of determining the target video clip is increased. The video set is also the television play.

Figure 12:
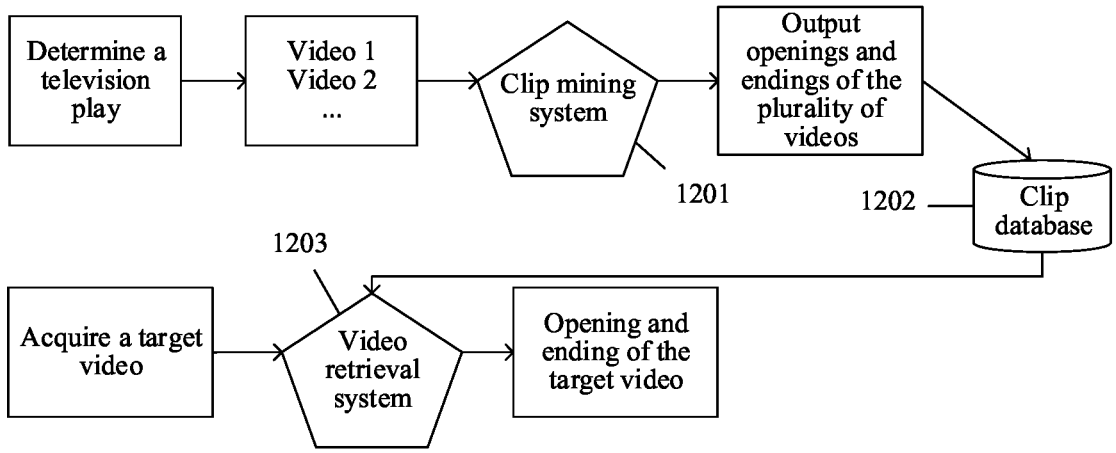
FIG. 12 is a flowchart of a method for acquiring an opening and an ending of a television play provided in an embodiment of this application.

The further description is to be given as follows in conjunction with FIG. 12.

A television play with an opening and an ending to be recognized is determined. A plurality of videos in the television play are acquired. The plurality of videos are inputted to a clip mining system 1201, and openings and endings of the plurality of videos are outputted by the clip mining system 1201. The openings and the endings of the plurality of videos are stored in a clip database 1202. When a target video of the television play is updated, the target video is inputted to a video retrieval system 1203, and the video retrieval system 1203 performs retrieval in the clip database 1202 by using the target video to obtain an opening and an ending of the target video. In the technical solutions provided in the embodiments of this application, openings and endings of videos in the same video set are mined by using a same video time period retrieval method, that is, for the same video set, the same video clips are found as the mined openings and endings by retrieval and time sequence positioning. Cross repetition removal means that repeated video clips are found by mutually retrieving the videos in the video set. The purpose of repetition removal retrieval for the videos is to retrieve the same video clips as an inventory video from the first video.

A video may have a plurality of openings or endings satisfying the above-mentioned requirements, which is normal. For a television play including an opening song, an interesting sidelight in this episode, the same product placement, and a feature film, the opening song and the product placement may be matched in a plurality of videos, but the interesting sidelights in all the episodes are different so as not to be matched, and therefore, two openings are to appear.

When the retrieval method for the video clip is applied to a scenario where infringing video is retrieved, the target video to be recognized is inputted to the video retrieval system, the video retrieval system performs feature extraction on the target video to obtain the video frame features of the plurality of target video frames, wherein the target video is also a video to be subjected to infringement recognition. By means of the video retrieval system, matching is performed in the clip database on the basis of the video frame features of the plurality of target video frames to obtain the target video clip in the target video, and the target video clip is also the opening or ending of the target video. The target video clip is deleted from the target video, infringement recognition is performed on the basis of the target video in which the target video clip is deleted, and the purpose of the infringement recognition is to determine whether a content of the target video in which the target video clip is deleted is the same as that of a specified video. The infringement recognition is implemented by an infringement recognition system, the infringement recognition system may perform repetition removal on queried videos in an infringement protection video database, and the videos are regarded to be infringing when the videos are found to be repeated. However, only feature film contents need to be protected, openings and endings of conventional films and television plays are not within the scope of infringement repetition removal, and by using the technical solutions provided in the embodiments of this application, the openings and the endings of the films and the television plays can be recognized.

Figure 13:
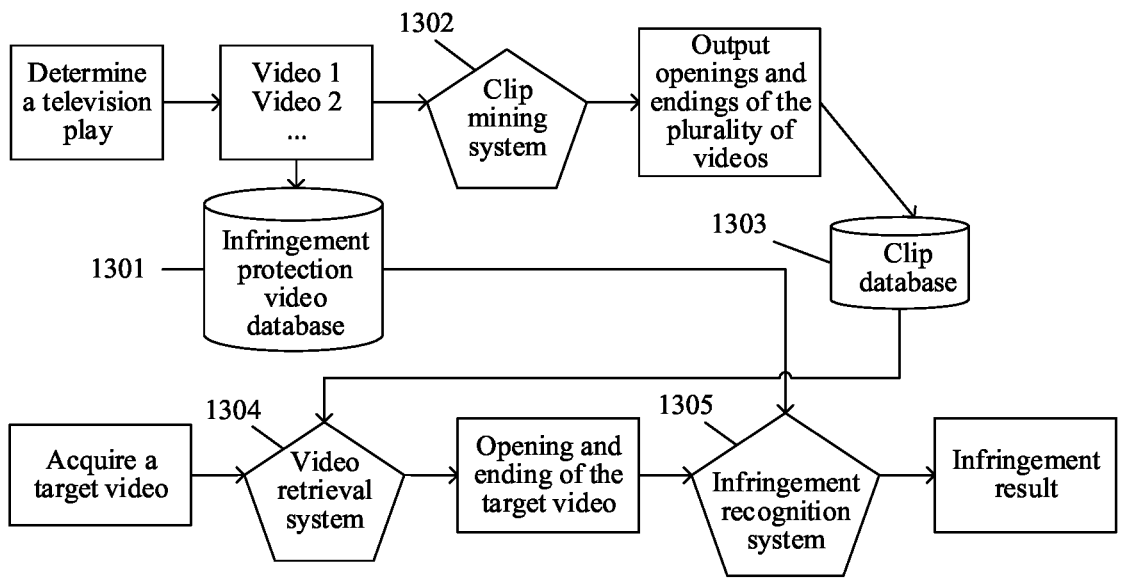
FIG. 13 is a flowchart of a method for recognizing an infringing video provided in an embodiment of this application.

The further description is to be given as follows in conjunction with FIG. 13.

A television play to be subjected to infringement recognition is determined. A plurality of videos in the television play are acquired. The plurality of videos are stored in an infringement protection video database 1301. The plurality of videos are inputted to a clip mining system 1302, and openings and endings of the plurality of videos are outputted by the clip mining system 1302. The openings and the endings of the plurality of videos are stored in a clip database 1303. When a target video is required to be subjected to infringement recognition, the target video is inputted to a video retrieval system 1304, and the video retrieval system 1304 performs retrieval in the clip database 1303 by using the target video to obtain an opening and an ending of the target video. The opening and the ending of the target video are deleted, an infringement result of the target video is outputted by an infringement recognition system 1305, and the infringement result includes infringement and non-infringement.

Figure 14:
FIG. 14 is a flowchart of a method for recognizing a video clip provided in an embodiment of this application.

In some embodiments, after querying in the clip database on the basis of the target video in the above-mentioned way, the server determines the longest target video clip in the plurality of target video clips as a final target video clip in the case that the plurality of target video clips of the target video are obtained. When the technical solutions provided in the embodiments of this application are applied to the recognition an opening and an ending of a video, the target video clip is also the opening and the ending of the target video, and the process thereof refers to FIG. 14.

In addition, the video retrieval system and the clip mining system may provide an external interface, i.e., retrieval storage and mining storage at the same time so that specific functions to be used as specified by users are enabled at the same time. It is also possible to only provide a recognition interface, and the background triggers the specific functions to be used according to a judgment whether an opening and an ending of a television play corresponding to the identifier of the video are retrieved or mined in an inventory, wherein the specific functions include retrieval and mining.

All the above-mentioned technical solutions can be combined in any way to form embodiments of this application, and the descriptions thereof are not to be repeated herein.

According to the technical solutions provided in the embodiments of this application, the video frame pairs including similar video frames are determined on the basis of the similarity between the video frame features. The first video frames in the video frame pairs are fused on the basis of the occurrence time differences to obtain the at least one candidate video clip. Finally, the target video clips within the target time range are determined from the at least one candidate video clip. The process of determining the target clips can be automatically performed, without human intervention, by a computer device directly on the basis of the first video and the at least one second video so as to be higher in efficiency.

By the design of the above-mentioned video clip matching algorithm, a similar video clip matching method based on video frame features is implemented, and it can support similar video clip matching with length change (which is embodied in a matching logic, and the merged frames are not required to be continuous front and back when matched frames are merged as a video frame pair under the same occurrence time difference) and position change (which is embodied in a matching logic, the position is not changed when the occurrence time difference is 0, and the position may be changed when the occurrence time difference is larger than 0). This method is little in time consumption and excellent in performance.

Figure 15:
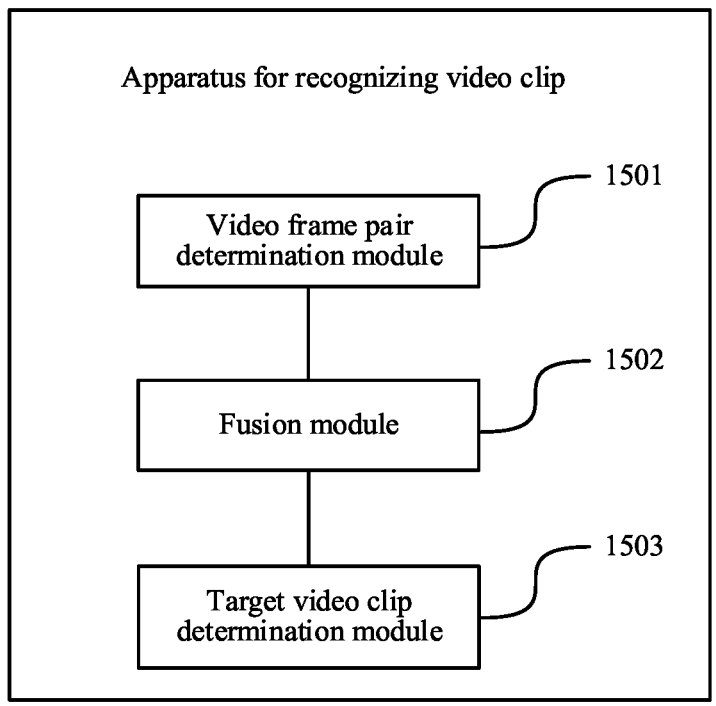
FIG. 15 is a schematic structural diagram of an apparatus for recognizing a video clip provided in an embodiment of this application.

FIG. 15 is a schematic structural diagram of an apparatus for recognizing a video clip provided in an embodiment of this application. With reference to FIG. 15, the apparatus includes a video frame pair determination module 1501, a fusion module 1502 and a target video clip determination module 1503.

The video frame pair determination module 1501 is configured to acquire video frame features of a first video and video frame features of at least one second video, and determine a plurality of video frame pairs on the basis of the video frame features of the first video and the video frame features of the at least one second video, wherein the video frame pair includes a first video frame and a second video frame with a similarity satisfying similarity conditions, the first video frame belongs to the first video, and the second video frame belongs to the at least one second video.

The fusion module 1502 is configured to fuse the first video frames in the plurality of video frame pairs on the basis of occurrence time differences of the plurality of video frame pairs to obtain at least one candidate video clip in the first video, wherein the occurrence time difference refers to a difference between occurrence times of the two video frames in each of the video frame pairs in the videos.

The target video clip determination module 1503 is configured to acquire a target time range, and determine at least one target video clip in the first video on the basis of the at least one candidate video clip and the target time range, wherein the target video clips are within the target time range of the first video.

In one of possible implementations, the fusion module 1502 is configured to divide the plurality of video frame pairs into a plurality of video frame groups on the basis of the occurrence time differences of the plurality of video frame pairs, wherein the video frame pairs in a same video frame group correspond to a same occurrence time difference; and for any one of the plurality of video frame groups, fuse the first video frames of the video frame pairs in the video frame group into one of the candidate video clips according to occurrence times of the first video frames of the video frame pairs in the video frame group in the first video.

In one of possible implementations, the fusion module 1502 is configured to, for any one of the plurality of video frame pairs, subtract the second occurrence time of the second video frame from the first occurrence time of the first video frame in the video frame pair to obtain an occurrence time difference of the video frame pair, wherein the first occurrence time refers to an occurrence time of the first video frame in the first video, and the second occurrence time refers to an occurrence time of the second video frame in the second video; divide the video frame pairs with a same occurrence time difference into an initial video frame group, and take the occurrence time difference of the video frame pairs in the initial video frame group as the occurrence time difference corresponding to the initial video frame group; and fuse the plurality of initial video frame groups on the basis of the occurrence time differences corresponding to the plurality of initial video frame groups to obtain the plurality of video frame groups.

In one of possible implementations, the fusion module 1502 is configured to sort the plurality of initial video frame groups according to the target order to obtain a plurality of candidate video frame groups; and for any two adjacent candidate video frame groups in the plurality of candidate video frame groups, fuse the two adjacent candidate video frame groups into one video frame group when a match time difference of the two adjacent candidate video frame groups satisfies match time difference conditions, wherein the match time difference refers to a difference between occurrence time differences corresponding to the two adjacent candidate video frame groups.

In one of possible implementations, the two adjacent candidate video frame groups include a first candidate video frame group and a second candidate video frame group. The fusion module 1502 is configured to add the video frame pairs in the first candidate video frame group to the second candidate video frame group to obtain the video frame group when a match time difference between an occurrence time difference corresponding to the first candidate video frame group and an occurrence time difference corresponding to the second candidate video frame group is smaller than or equal to a match difference threshold.

In one of possible implementations, the two adjacent candidate video frame groups include a first candidate video frame group and a second candidate video frame group. The fusion module 1502 is configured to add the video frame pairs in the first candidate video frame group to the second candidate video frame group to obtain the video frame group when a match time difference between the first candidate video frame group and the second candidate video frame group is smaller than or equal to a match difference threshold; and replace target second video frames with reference second video frames on the basis of an occurrence time difference corresponding to the second candidate video frame group to obtain the video frame group, wherein the target second video frames are second video frames newly added to the second candidate video frame group, the reference second video frames are second video frames in the second video which have occurrence time differences being a target difference with target first video frames, and the target first video frames are first video frames in video frame pairs to which the target second video frames belong.

In one of possible implementations, the fusion module 1502 is configured to traverse the video frame pairs in the video frame group, and determine a current video frame pair which is traversed currently and a previous video frame pair which is traversed previously, wherein the current video frame pair and the previous video frame pair are two adjacent video frame pairs in the video frame group; compare occurrence times of first video frames of the current video frame pair and the previous video frame pair in the first video to obtain a difference between the occurrence times of the first video frames; add the current video frame pair and the previous video frame pair to a temporary frame list when the difference between the occurrence times of the first video frames satisfies occurrence time conditions; fuse the video frame pairs in the temporary frame list into a reference video clip when the difference between the occurrence times of the first video frames does not satisfy the occurrence time conditions, and empty the temporary frame list after the fusing; determine a next traversed video frame pair, take the next traversed video frame pair as a new current video frame pair, and continue to perform the operation of comparing occurrence times of first video frames of the current video frame pair and the previous video frame pair in the first video until the last traversed video frame pair; and determine the at least one candidate video clip on the basis of a plurality of reference video clips.

In one of possible implementations, the plurality of reference video clips include first overlapping video clips, wherein the first overlapping video clips refer to reference video clips belonging to first reference video clips in the plurality of reference video clips. The fusion module 1502 is configured to delete the first overlapping video clips to obtain the at least one candidate video clip when the plurality of reference video clips include the first overlapping video clips.

In one of possible implementations, the plurality of reference video clips include second overlapping video clips, wherein the second overlapping video clips refer to reference video clips partially overlapping with second reference video clips in the plurality of reference video clips. The fusion module 1502 is configured to delete overlapping parts of the second overlapping video clips and the second reference video clips to obtain the at least one candidate video clip when the plurality of reference video clips include the second overlapping video clips.

In one of possible implementations, the fusion module 1502 is further configured to compare durations of third reference video clips with a target duration, wherein the third reference video clips refer to the second overlapping video clips in which the overlapping parts are deleted; retain the third reference video clips when the durations of the third reference video clips are greater than or equal to the target duration; and delete the third reference video clips when the durations of the third reference video clips are less than or equal to the target duration.

In one of possible implementations, the target video clip determination module 1503 is configured to determine at least one target candidate video clip on the basis of the at least one candidate video clip, wherein occurrence numbers of the target candidate video clips in the at least one candidate video clip satisfy number conditions.

For any one of the target candidate video clips, the target candidate video clip is determined as the target video clip in the first video when the occurrence time of the target candidate video clip in the first video is within the target time range.

In one of possible implementations, the target video clip determination module 1503 is configured to determine at least one reference candidate video clip on the basis of the at least one candidate video clip; determine an occurrence number of each of the reference candidate video clips in the at least one reference candidate video clip; and determine the reference candidate video clips with occurrence numbers satisfying occurrence number conditions as the target candidate video clips.

In one of possible implementations, the at least one candidate video clip includes third overlapping video clips, wherein the third overlapping video clips refer to candidate video clips belonging to the first candidate video clips in the at least one candidate video clip. The target video clip determination module 1503 is configured to delete the third overlapping video clips to obtain the at least one reference candidate video clip when the at least one candidate video clip includes the third overlapping video clips.

In one of possible implementations, the at least one candidate video clip includes fourth overlapping video clips, wherein the fourth overlapping video clips refer to candidate video clips partially overlapping with the second candidate video clips in the at least one candidate video clip. The target video clip determination module 1503 is configured to determine occurrence numbers of the fourth overlapping video clips when the at least one candidate video clip includes the fourth overlapping video clips and overlap ratios of the fourth overlapping video clips to the second candidate video clips satisfy overlap ratio conditions; and determine the at least one reference candidate video clip on the basis of the occurrence numbers of the corresponding fourth overlapping video clips with the overlap ratios satisfying the overlap ratio conditions.

In one of possible implementations, the at least one candidate video clip includes fourth overlapping video clips, wherein the fourth overlapping video clips refer to candidate video clips partially overlapping with the second candidate video clips in the at least one candidate video clip. The target video clip determination module 1503 is configured to delete the fourth overlapping video clips to obtain the at least one reference candidate video clip when the at least one candidate video clip includes the fourth overlapping video clips and the overlap ratios of the fourth overlapping video clips to the second candidate video clips do not satisfy the overlap ratio conditions.

In one of possible implementations, the at least one candidate video clip includes fourth overlapping video clips, wherein the fourth overlapping video clips refer to candidate video clips partially overlapping with the second candidate video clips in the at least one candidate video clip. The target video clip determination module 1503 is configured to delete the fourth overlapping video clips to obtain the at least one reference candidate video clip when the at least one candidate video clip includes the fourth overlapping video clips and durations of the fourth overlapping video clips are less than durations of the second candidate video clips.

In one of possible implementations, the target video clip determination module 1503 is configured to, for any one of the fourth overlapping video clips satisfying the overlap ratio conditions in the at least one candidate video clip, fuse the fourth overlapping video clip with the second candidate video clips to obtain the at least one reference candidate video clip when the occurrence number of the fourth overlapping video clip is larger than or equal to a first occurrence number threshold.

In one of possible implementations, the target video clip determination module 1503 is configured to, for any one of the fourth overlapping video clips satisfying the overlap ratio conditions in the at least one candidate video clip, delete the fourth overlapping video clip to obtain the at least one reference candidate video clip when the occurrence number of the fourth overlapping video clip is smaller than or equal to the first occurrence number threshold.

In one of possible implementations, the apparatus further includes:

a feature extraction module configured to perform feature extraction on a plurality of target video frames of the target video to be recognized to obtain video frame features of the plurality of target video frames.

The target video clip determination module 1503 is configured to determine at least one target video clip of the target video on the basis of the video frame features of the plurality of the target video frames, the video frame features of the first video frames, and the video frame features of the at least one second video.

The apparatus for recognizing the video clip provided in the above-mentioned embodiment only illustrates the division of all of the above-mentioned functional modules when recognizing a video clip. In practical applications, the above-mentioned functional allocation can be completed by the different functional modules as required, that is, an internal structure of a computer device is divided into different functional modules so that all or parts of the functions described above are completed. In addition, the apparatus for recognizing the video clip provided in the above-mentioned embodiments is based on the same concept as the embodiments of the method for recognizing the video clip, and a detailed implementation process thereof refers to the detailed description in the method embodiments, and therefore, the descriptions thereof are not to be repeated herein.

According to the technical solutions provided in the embodiments of this application, the video frame pairs including similar video frames are determined on the basis of the similarity between the video frame features. The first video frames in the video frame pairs are fused on the basis of the occurrence time differences to obtain the at least one candidate video clip. Finally, the target video clips within the target time range are determined from the at least one candidate video clip. The process of determining the target clips can be automatically performed, without human intervention, by a computer device directly on the basis of the first video and the at least one second video so as to be higher in efficiency.

An embodiment of this application provides a computer device configured to perform the above-mentioned method. The computer device may be implemented as a terminal or a server. A structure of the terminal is to be firstly introduced as follows.

Figure 16:
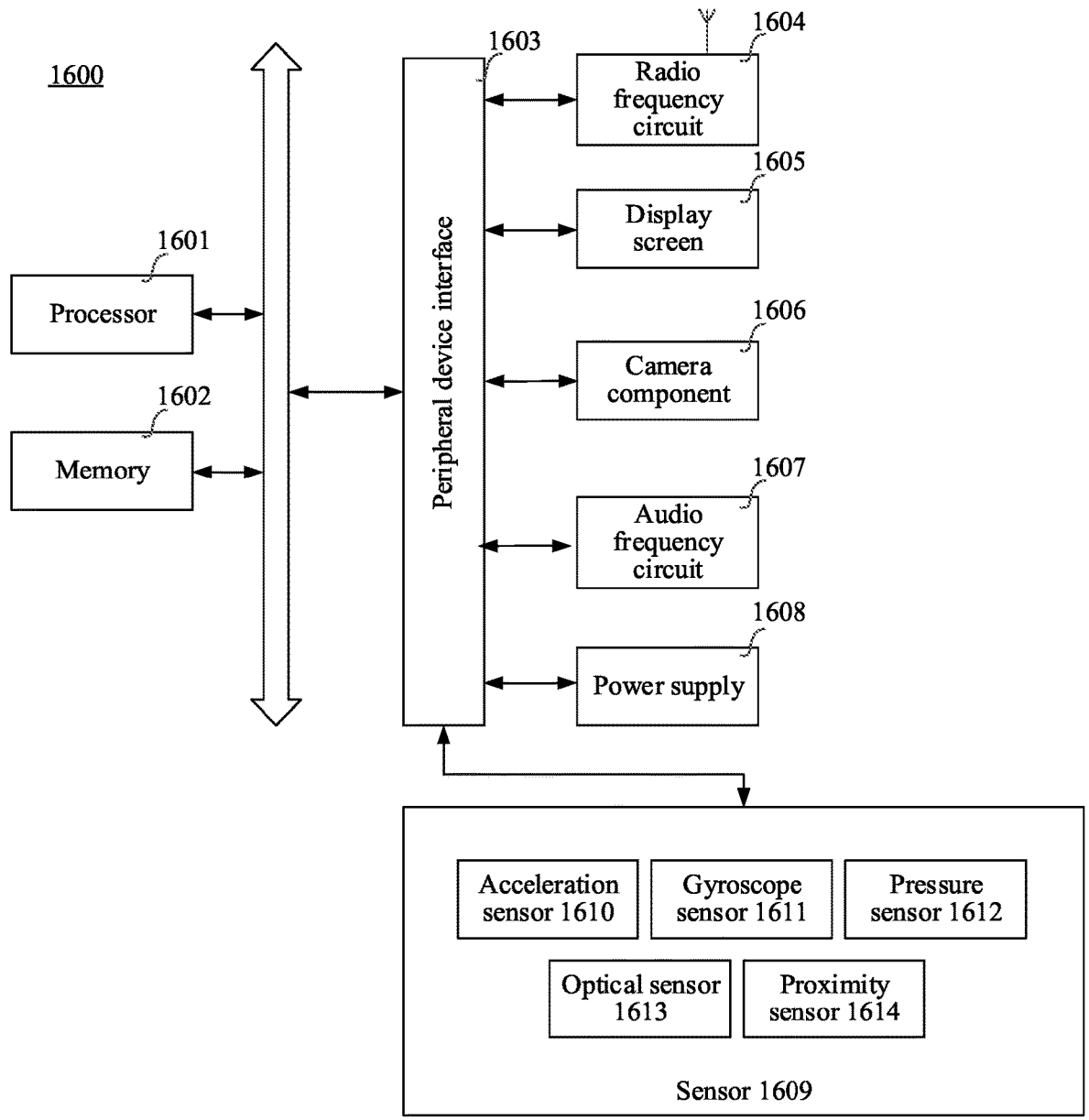
FIG. 16 is a schematic structural diagram of a terminal provided in an embodiment of this application.

FIG. 16 is a schematic structural diagram of a terminal provided in an embodiment of this application.

Generally, the terminal 1600 includes one or more processors 1601 and one or more memories 1602.

The processor 1601 may include one or more processing cores, such as a 4-core processor and an 8-core processor. The processor 1601 may be implemented in at least one hardware form of digital signal processing (DSP), a field-programmable gate array (FPGA), and a programmable logic array (PLA). The processor 1601 may also include a main processor and a co-processor; the main processor is a processor for processing data in a wake-up state and is also called a central processing unit (CPU); and the co-processor is a low-power processor for processing data in a standby state. In some embodiments, the processor 1601 may be integrated with a graphics processing unit (GPU) responsible for rendering and drawing a content that needs to be displayed on a display screen. In some embodiments, the processor 1601 may further include an artificial intelligence (AI) processor for processing computing operations related to machine learning.

The memory 1602 may include one or more computer readable storage media which may be non-transient. The memory 1602 may further include a high-speed random access memory and a non-volatile memory, such as one or more magnetic disk storage devices and flash storage devices. In some embodiments, a non-transient computer readable storage medium in the memory 1602 is configured to store at least one computer program, and the at least one computer program is executed by the processor 1601 to implement the method for recognizing the video clip provided in each of the method embodiments of this application.

In some embodiments, the terminal 1600 may include: a peripheral device interface 1603 and at least one peripheral device. The processor 1601, the memory 1602 and the peripheral device interface 1603 may be connected by a bus or a signal line. Each peripheral device may be connected to the peripheral device interface 1603 by a bus, a signal line or a circuit board. Specifically, each peripheral device includes at least one of a radio frequency circuit 1604, a display screen 1605, a camera component 1606, an audio frequency circuit 1607, and a power supply 1608.

The peripheral device interface 1603 may be configured to connect at least one peripheral device related to input/output (I/O) to the processor 1601 and the memory 1602. In some embodiments, the processor 1601, the memory 1602 and the peripheral device interface 1603 are integrated on the same chip or circuit board. In some other embodiments, any one or two of the processor 1601, the memory 1602 and the peripheral device interface 1603 may be implemented on a separate chip or circuit board, which is not limited in this embodiment.

The radio frequency circuit 1604 is configured to receive and transmit radio frequency (RF) signals also referred to as electromagnetic signals. The radio frequency circuit 1604 communicates with a communication network and other communication devices by the electromagnetic signals. The radio frequency circuit 1604 converts an electrical signal into an electromagnetic signal for transmission, or converts a received electromagnetic signal into an electrical signal. Optionally, the radio frequency circuit 1604 includes an antenna system, an RF transceiver, one or more amplifiers, a tuner, an oscillator, a digital signal processor, a codec chipset, a user identity module card, etc.

The display screen 1605 is configured to display a user interface (UI). The UI may include a graph, a text, an icon, a video, and any combinations thereof. When the display screen 1605 is a touch screen, the display screen 1605 further has an ability to collect a touch signal on or above a surface of the display screen 1605. The touch signal may be used as a control signal to be inputted into the processor 1601 for processing. At the moment, the display screen 1605 may further be configured to provide a virtual button and/or a virtual keyboard also referred to as a soft button and/or a soft keyboard.

The camera component 1606 is configured to collect images or videos. Optionally, the camera component 1606 includes a front camera and a rear camera. Generally, the front camera is disposed on a front panel of the terminal, and the rear camera is disposed on the back of the terminal.

The audio frequency circuit 1607 may include a microphone and a loudspeaker. The microphone is configured to collect sound waves from a user and an environment and convert the sound waves into electrical signals to be inputted into the processor 1601 for processing or to be inputted into the radio frequency circuit 1604 to implement voice communication.

The power supply 1608 is configured to supply power for the various components in the terminal 1600. The power supply 1608 may be an AC, DC, disposable or rechargeable battery.

In some embodiments, the terminal 1600 further includes one or more sensors 1609. The one or more sensors 1609 include, but are not limited to an acceleration sensor 1610, a gyro sensor 1611, a pressure sensor 1612, an optical sensor 1613, and a proximity sensor 1614.

The acceleration sensor 1610 may detect an acceleration on three coordinate axes of a coordinate system established by the terminal 1600.

The gyroscope sensor 1611 may acquire a body direction and a rotation angle of the terminal 1600, and the gyroscope sensor 1611 may cooperate with the acceleration sensor 1610 to acquire a user's 3D action on the terminal 1600.

The pressure sensor 1612 may be disposed on a side frame of the terminal 1600 and/or a lower layer of the display screen 1605. When being disposed on the side frame of the terminal 1600, the pressure sensor 1612 may detect a user's holding signal for the terminal 1600, and the processor 1601 performs left-right hand recognition or rapid operation according to the holding signal collected by the pressure sensor 1612. When the pressure sensor 1612 is disposed on the lower layer of the display screen 1605, the processor 1601 controls operability controls on the UI according to a user's pressure operation for the display screen 1605.

The optical sensor 1613 is configured to collect an ambient light intensity. In one embodiment, the processor 1601 may control the display brightness of the display screen 1605 according to the ambient light intensity collected by the optical sensor 1613.

The proximity sensor 1614 is configured to collect a distance between the user and a front of the terminal 1600.

It is to be understood by those skilled in the art that the structure shown in FIG. 16 is not to be construed as a limitation on the terminal 1600, may include more or fewer components than the figure, or be combined with some components, or disposed with different components.

The above-mentioned computer device may be further implemented as a server, and a structure of the server is to be described as follows.

Figure 17:
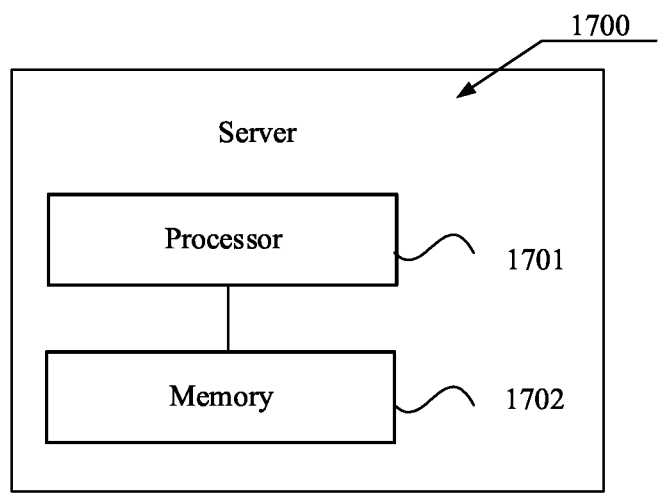
FIG. 17 is a schematic structural diagram of a server provided in an embodiment of this application.

FIG. 17 is a schematic structural diagram of a server provided in an embodiment of this application. The server 1700 may greatly vary in configuration or performance, and may include one or more central processing units (CPU) 1701 and one or more memories 1702, wherein at least one computer program is stored in the one or more memories 1702, and the at least one computer program is loaded and executed by the one or more processors 1701 to implement the methods provided in each of the above-mentioned method embodiments. Of course, the server 1700 may further be provided with components such as a wired or wireless network interface, a keyboard and an input/output interface so as to perform input/output, the server 1700 may further include other components configured to implement functions of the device, and therefore, the descriptions thereof are not to be repeated herein.

In an exemplary embodiment, further provided is a computer readable storage medium having stored thereon at least one computer program which is loaded and executed by a processor to implement the method for recognizing the video clip in the above-mentioned embodiments. For example, the computer readable storage medium may be a read-only memory (ROM), a random access memory (RAM), a compact disc read-only memory (CD-ROM), a magnetic tape, a floppy disk, an optical data storage device, etc.

In an exemplary embodiment, further provided is a computer program product, having stored thereon a computer program which, when executed by a processor, implements the above-mentioned method for recognizing the video clip.

In some embodiments, the computer programs involved in the embodiments of this application may be deployed to be executed on one computer device, or executed on a plurality of computer devices located on the same site, or executed on a plurality of computer devices distributed on a plurality of sites and interconnected by a communication network, and the plurality of computer devices distributed on the plurality of sites and interconnected by the communication network may form a block chain system.

It is to be understood by those of ordinary skill in the art that all or parts of the steps in the above-mentioned embodiments may be performed by hardware, or may be performed by a program instructing relevant hardware, the program may be stored in a computer readable storage medium, and the above-mentioned storage medium may be a read-only memory, a magnetic disk or an optical disk, etc.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The above descriptions are only embodiments of this application, and are not intended to limit this application. Any modifications, equivalent replacements, improvements, etc. made within the spirit and principle of this application shall fall within the protection scope of this application.

What is claimed is:

1. A method for recognizing a video clip, performed by a computer device, the method comprising:
   determining a plurality of video frame pairs between a first video and at least one second video, each video frame pair comprising a first video frame from the first video and a second video frame from the at least second video with a similarity satisfying similarity conditions;
   fusing the first video frames in the plurality of video frame pairs on the basis of occurrence time differences of each video frame pair to obtain at least one candidate video clip in the first video; and
   determining at least one target video clip in the first video on the basis of the at least one candidate video clip, the at least one target video clip being within a target time range of the first video.

2. The method of claim 1, wherein the fusing the first video frames in the plurality of video frame pairs on the basis of occurrence time differences of each video frame pair to obtain at least one candidate video clip in the first video comprises:

dividing the plurality of video frame pairs into a plurality of video frame groups on the basis of the occurrence time differences of each video frame pair, wherein the video frame pairs within a same video frame group correspond to a same occurrence time difference; and
for a respective one of the plurality of video frame groups, fusing the first video frames of the video frame pairs in the video frame group into one of the candidate video clips according to occurrence times of the first video frames of the video frame pairs in the video frame group in the first video.

3. The method of claim 2, wherein before the dividing the plurality of video frame pairs into a plurality of video frame groups on the basis of the occurrence time differences of the plurality of video frame pairs, the method further comprises:
for any one of the plurality of video frame pairs, determining a first occurrence time of the first video frame and a second occurrence time of the second video frame in the video frame pair; the first occurrence time referring to an occurrence time of the first video frame in the first video, and the second occurrence time referring to an occurrence time of the second video frame in the second video;
subtracting the second occurrence time of the second video frame from the first occurrence time of the first video frame in the video frame pair to obtain an occurrence time difference of the video frame pair;
the dividing the plurality of video frame pairs into a plurality of video frame groups on the basis of the occurrence time differences of the plurality of video frame pairs comprises: dividing the video frame pairs with a same occurrence time difference into an initial video frame group, and taking the occurrence time difference of the video frame pairs in the initial video frame group as the occurrence time difference corresponding to the initial video frame group; and
fusing the plurality of initial video frame groups on the basis of the occurrence time differences corresponding to the plurality of initial video frame groups to obtain the plurality of video frame groups.

4. The method of claim 2, wherein the fusing the first video frames of the video frame pairs in the video frame group into one of the candidate video clips according to occurrence times of the first video frames of the video frame pairs in the video frame group in the first video comprises:
traversing the video frame pairs in the video frame group, and determining a current video frame pair which is traversed currently and a previous video frame pair which is traversed previously; the current video frame pair and the previous video frame pair being two adjacent video frame pairs in the video frame group;
comparing occurrence times of first video frames of the current video frame pair and the previous video frame pair in the first video to obtain a difference between the occurrence times of the first video frames;
adding the current video frame pair and the previous video frame pair to a temporary frame list when the difference between the occurrence times of the first video frames satisfies occurrence time conditions;
fusing the video frame pairs in the temporary frame list into a reference video clip when the difference between the occurrence times of the first video frames does not satisfy the occurrence time conditions, and emptying the temporary frame list after the fusing;
determining a next traversed video frame pair, taking the next traversed video frame pair as a new current video frame pair, and continuing to perform the operation of comparing occurrence times of first video frames of the current video frame pair and the previous video frame pair in the first video until the last traversed video frame pair; and
determining the at least one candidate video clip on the basis of a plurality of reference video clips.

5. The method of claim 1, wherein the determining at least one target video clip in the first video on the basis of the at least one candidate video clip comprises:
determining at least one target candidate video clip on the basis of the at least one candidate video clip, occurrence numbers of the target candidate video clips in the at least one candidate video clip satisfying number conditions; and
for a respective one of the target candidate video clips, determining the target candidate video clip as the target video clip in the first video when the occurrence time of the target candidate video clip in the first video is within the target time range.

6. The method of claim 5, wherein the determining at least one target candidate video clip on the basis of the at least one candidate video clip comprises:
determining at least one reference candidate video clip on the basis of the at least one candidate video clip;
determining an occurrence number of each of the reference candidate video clips in the at least one reference candidate video clip; and
determining the reference candidate video clips with occurrence numbers satisfying occurrence number conditions as the target candidate video clips.

7. The method of claim 1, wherein the method further comprises:
acquiring a target video to be recognized, and performing feature extraction on a plurality of target video frames of the target video to be recognized to obtain video frame features of the plurality of target video frames; and
determining at least one target video clip of the target video on the basis of the video frame features of the plurality of the target video frames, the video frame features of the first video frames, and the video frame features of the at least one second video.

8. A computer device, comprising one or more processors, and one or more memories having stored thereon at least one computer program that, when executed by the one or more processors, cause the computer device to implement a method for recognizing a video clip including:
determining a plurality of video frame pairs between a first video and at least one second video, each video frame pair comprising a first video frame from the first video and a second video frame from the at least second video with a similarity satisfying similarity conditions;
fusing the first video frames in the plurality of video frame pairs on the basis of occurrence time differences of each video frame pair to obtain at least one candidate video clip in the first video; and
determining at least one target video clip in the first video on the basis of the at least one candidate video clip, the at least one target video clip being within a target time range of the first video.

9. The computer device of claim 8, wherein the fusing the first video frames in the plurality of video frame pairs on the basis of occurrence time differences of each video frame pair to obtain at least one candidate video clip in the first video comprises:
dividing the plurality of video frame pairs into a plurality of video frame groups on the basis of the occurrence time differences of each video frame pair, wherein the video frame pairs within a same video frame group correspond to a same occurrence time difference; and for a respective one of the plurality of video frame groups, fusing the first video frames of the video frame pairs in the video frame group into one of the candidate video clips according to occurrence times of the first video frames of the video frame pairs in the video frame group in the first video.

10. The computer device of claim 9, wherein before the dividing the plurality of video frame pairs into a plurality of video frame groups on the basis of the occurrence time differences of the plurality of video frame pairs, the method further comprises:

for any one of the plurality of video frame pairs, determining a first occurrence time of the first video frame and a second occurrence time of the second video frame in the video frame pair; the first occurrence time referring to an occurrence time of the first video frame in the first video, and the second occurrence time referring to an occurrence time of the second video frame in the second video;

subtracting the second occurrence time of the second video frame from the first occurrence time of the first video frame in the video frame pair to obtain an occurrence time difference of the video frame pair;

the dividing the plurality of video frame pairs into a plurality of video frame groups on the basis of the occurrence time differences of the plurality of video frame pairs comprises: dividing the video frame pairs with a same occurrence time difference into an initial video frame group, and taking the occurrence time difference of the video frame pairs in the initial video frame group as the occurrence time difference corresponding to the initial video frame group; and fusing the plurality of initial video frame groups on the basis of the occurrence time differences corresponding to the plurality of initial video frame groups to obtain the plurality of video frame groups.

11. The computer device of claim 9, wherein the fusing the first video frames of the video frame pairs in the video frame group into one of the candidate video clips according to occurrence times of the first video frames of the video frame pairs in the video frame group in the first video comprises:

traversing the video frame pairs in the video frame group, and determining a current video frame pair which is traversed currently and a previous video frame pair which is traversed previously; the current video frame pair and the previous video frame pair being two adjacent video frame pairs in the video frame group;

comparing occurrence times of first video frames of the current video frame pair and the previous video frame pair in the first video to obtain a difference between the occurrence times of the first video frames;

adding the current video frame pair and the previous video frame pair to a temporary frame list when the difference between the occurrence times of the first video frames satisfies occurrence time conditions;

fusing the video frame pairs in the temporary frame list into a reference video clip when the difference between the occurrence times of the first video frames does not satisfy the occurrence time conditions, and emptying the temporary frame list after the fusing;

determining a next traversed video frame pair, taking the next traversed video frame pair as a new current video frame pair, and continuing to perform the operation of comparing occurrence times of first video frames of the current video frame pair and the previous video frame pair in the first video until the last traversed video frame pair; and determining the at least one candidate video clip on the basis of a plurality of reference video clips.

12. The computer device of claim 8, wherein the determining at least one target video clip in the first video on the basis of the at least one candidate video clip comprises:

determining at least one target candidate video clip on the basis of the at least one candidate video clip, occurrence numbers of the target candidate video clips in the at least one candidate video clip satisfying number conditions; and for a respective one of the target candidate video clips, determining the target candidate video clip as the target video clip in the first video when the occurrence time of the target candidate video clip in the first video is within the target time range.

13. The computer device of claim 12, wherein the determining at least one target candidate video clip on the basis of the at least one candidate video clip comprises:

determining at least one reference candidate video clip on the basis of the at least one candidate video clip;

determining an occurrence number of each of the reference candidate video clips in the at least one reference candidate video clip; and determining the reference candidate video clips with occurrence numbers satisfying occurrence number conditions as the target candidate video clips.

14. The computer device of claim 8, wherein the method further comprises:

acquiring a target video to be recognized, and performing feature extraction on a plurality of target video frames of the target video to be recognized to obtain video frame features of the plurality of target video frames; and determining at least one target video clip of the target video on the basis of the video frame features of the plurality of the target video frames, the video frame features of the first video frames, and the video frame features of the at least one second video.

15. A non-transitory computer readable storage medium, having stored thereon at least one computer program that, when executed by one or more processors of a computer device, causes the computer device to implement a method for recognizing a video clip including:

determining a plurality of video frame pairs between a first video and at least one second video, each video frame pair comprising a first video frame from the first video and a second video frame from the at least second video with a similarity satisfying similarity conditions;

fusing the first video frames in the plurality of video frame pairs on the basis of occurrence time differences of each video frame pair to obtain at least one candidate video clip in the first video; and determining at least one target video clip in the first video on the basis of the at least one candidate video clip, the at least one target video clip being within a target time range of the first video.

16. The non-transitory computer readable storage medium of claim 15, wherein the fusing the first video frames in the plurality of video frame pairs on the basis of occurrence time differences of each video frame pair to obtain at least one candidate video clip in the first video comprises:

dividing the plurality of video frame pairs into a plurality of video frame groups on the basis of the occurrence time differences of each video frame pair, wherein the video frame pairs within a same video frame group correspond to a same occurrence time difference; and for a respective one of the plurality of video frame groups, fusing the first video frames of the video frame pairs in the video frame group into one of the candidate video clips according to occurrence times of the first video frames of the video frame pairs in the video frame group in the first video.

17. The non-transitory computer readable storage medium of claim 16, wherein before the dividing the plurality of video frame pairs into a plurality of video frame groups on the basis of the occurrence time differences of the plurality of video frame pairs, the method further comprises:

for any one of the plurality of video frame pairs, determining a first occurrence time of the first video frame and a second occurrence time of the second video frame in the video frame pair; the first occurrence time referring to an occurrence time of the first video frame in the first video, and the second occurrence time referring to an occurrence time of the second video frame in the second video;

subtracting the second occurrence time of the second video frame from the first occurrence time of the first video frame in the video frame pair to obtain an occurrence time difference of the video frame pair;

the dividing the plurality of video frame pairs into a plurality of video frame groups on the basis of the occurrence time differences of the plurality of video frame pairs comprises: dividing the video frame pairs with a same occurrence time difference into an initial video frame group, and taking the occurrence time difference of the video frame pairs in the initial video frame group as the occurrence time difference corresponding to the initial video frame group; and fusing the plurality of initial video frame groups on the basis of the occurrence time differences corresponding to the plurality of initial video frame groups to obtain the plurality of video frame groups.

18. The non-transitory computer readable storage medium of claim 16, wherein the fusing the first video frames of the video frame pairs in the video frame group into one of the candidate video clips according to occurrence times of the first video frames of the video frame pairs in the video frame group in the first video comprises:

traversing the video frame pairs in the video frame group, and determining a current video frame pair which is traversed currently and a previous video frame pair which is traversed previously; the current video frame pair and the previous video frame pair being two adjacent video frame pairs in the video frame group;

comparing occurrence times of first video frames of the current video frame pair and the previous video frame pair in the first video to obtain a difference between the occurrence times of the first video frames;

adding the current video frame pair and the previous video frame pair to a temporary frame list when the difference between the occurrence times of the first video frames satisfies occurrence time conditions;

fusing the video frame pairs in the temporary frame list into a reference video clip when the difference between the occurrence times of the first video frames does not satisfy the occurrence time conditions, and emptying the temporary frame list after the fusing;

determining a next traversed video frame pair, taking the next traversed video frame pair as a new current video frame pair, and continuing to perform the operation of comparing occurrence times of first video frames of the current video frame pair and the previous video frame pair in the first video until the last traversed video frame pair; and determining the at least one candidate video clip on the basis of a plurality of reference video clips.

19. The non-transitory computer readable storage medium of claim 15, wherein the determining at least one target video clip in the first video on the basis of the at least one candidate video clip comprises:

determining at least one target candidate video clip on the basis of the at least one candidate video clip, occurrence numbers of the target candidate video clips in the at least one candidate video clip satisfying number conditions; and for a respective one of the target candidate video clips, determining the target candidate video clip as the target video clip in the first video when the occurrence time of the target candidate video clip in the first video is within the target time range.

20. The non-transitory computer readable storage medium of claim 19, wherein the determining at least one target candidate video clip on the basis of the at least one candidate video clip comprises:

determining at least one reference candidate video clip on the basis of the at least one candidate video clip;

determining an occurrence number of each of the reference candidate video clips in the at least one reference candidate video clip; and determining the reference candidate video clips with occurrence numbers satisfying occurrence number conditions as the target candidate video clips.

* * * * *